(12) United States Patent
Singer et al.

(10) Patent No.: US 7,860,922 B2
(45) Date of Patent: *Dec. 28, 2010

(54) METHOD AND DEVICE FOR THE WIRELESS EXCHANGE OF MEDIA CONTENT BETWEEN MOBILE DEVICES BASED ON CONTENT PREFERENCES

(75) Inventors: Howard Singer, Morganville, NJ (US); Laird Popkin, New York, NY (US); Yariv Sadan, Tenafly, NJ (US)

(73) Assignee: Time Warner, Inc., New York, NY (US)

( * ) Notice: Subject to any disclaimer, the term of this patent is extended or adjusted under 35 U.S.C. 154(b) by 570 days.

This patent is subject to a terminal disclaimer.

(21) Appl. No.: 10/922,226

(22) Filed: Aug. 18, 2004

(65) Prior Publication Data

US 2006/0041943 A1 Feb. 23, 2006

(51) Int. Cl.
*G06F 15/16* (2006.01)
(52) U.S. Cl. ...................................................... 709/203
(58) Field of Classification Search .................. 709/203
See application file for complete search history.

(56) References Cited

U.S. PATENT DOCUMENTS

| | | | |
|---|---|---|---|
| 6,307,837 B1 | 10/2001 | Ichikawa | |
| 6,434,134 B1 | 8/2002 | La Porta et al. | |
| 6,502,194 B1* | 12/2002 | Berman et al. | 726/28 |
| 6,678,252 B1 | 1/2004 | Cansever | |
| 6,744,740 B2 | 6/2004 | Chen | |
| 7,072,846 B1 | 7/2006 | Robinson | |
| 7,130,921 B2* | 10/2006 | Goodman et al. | 709/244 |
| 7,143,102 B2* | 11/2006 | Fiennes et al. | 707/102 |
| 2002/0059144 A1* | 5/2002 | Meffert et al. | 705/51 |
| 2002/0080888 A1 | 6/2002 | Shu et al. | |
| 2002/0138552 A1* | 9/2002 | DeBruine et al. | 709/203 |
| 2003/0032419 A1* | 2/2003 | Shibasaki et al. | 455/419 |
| 2003/0050966 A1 | 3/2003 | Dutta et al. | |

(Continued)

FOREIGN PATENT DOCUMENTS

WO   WO 2006/023733 A2   3/2006

(Continued)

OTHER PUBLICATIONS

ISR for PCT/US05/29574, Mar. 22, 2006, Time Warner, Inc.

(Continued)

*Primary Examiner*—Douglas B Blair
*Assistant Examiner*—Oleg Survillo
(74) *Attorney, Agent, or Firm*—Proskauer Rose LLP

(57) ABSTRACT

Ad hoc application-level connections are established between wireless devices. Autonomous selection of files on a provider device facilitates migration of a file from the file provider to a file receiver. Once a file provider and a file receiver are communicatively coupled using an application-level connection, a portion of a determined file is conveyed from the provider node to a receiver node while a connection remains viable. If the connection is severed, a neighbor node and a provider node may again recognize each other. A connection can then be re-established. Once the connection is re-established, a further portion of the file can be conveyed from a provider node to the receiver node.

14 Claims, 36 Drawing Sheets

U.S. PATENT DOCUMENTS

| | | | |
|---|---|---|---|
| 2003/0061137 A1 | 3/2003 | Leung et al. | |
| 2003/0061206 A1* | 3/2003 | Qian | 707/3 |
| 2003/0069749 A1* | 4/2003 | Shear et al. | 705/1 |
| 2003/0069921 A1* | 4/2003 | Lamming et al. | 709/203 |
| 2003/0079133 A1 | 4/2003 | Breiter et al. | |
| 2003/0097449 A1 | 5/2003 | Derocher et al. | |
| 2003/0120817 A1 | 6/2003 | Ott et al. | |
| 2003/0202494 A1 | 10/2003 | Drews et al. | |
| 2004/0034601 A1* | 2/2004 | Kreuzer | 705/52 |
| 2004/0122958 A1 | 6/2004 | Wardrop | |
| 2004/0143736 A1* | 7/2004 | Cross et al. | 713/165 |
| 2004/0199809 A1 | 10/2004 | Hanam et al. | |
| 2004/0203698 A1* | 10/2004 | Comp | 455/421 |
| 2004/0260669 A1 | 12/2004 | Fernandez | |
| 2004/0264489 A1* | 12/2004 | Klemets et al. | 370/428 |
| 2005/0066063 A1* | 3/2005 | Grigorovitch et al. | 710/1 |
| 2005/0131761 A1 | 6/2005 | Trika et al. | |
| 2005/0160111 A1* | 7/2005 | Plastina et al. | 707/102 |
| 2005/0165795 A1* | 7/2005 | Myka et al. | 707/100 |
| 2005/0227739 A1* | 10/2005 | Dowling et al. | 455/566 |
| 2005/0248663 A1* | 11/2005 | Owens et al. | 348/222.1 |
| 2006/0008256 A1* | 1/2006 | Khedouri et al. | 386/124 |
| 2006/0014521 A1* | 1/2006 | Chen et al. | 455/410 |
| 2006/0031558 A1* | 2/2006 | Ortega et al. | 709/232 |
| 2006/0035713 A1* | 2/2006 | Cockerille et al. | 463/42 |
| 2006/0039303 A1 | 2/2006 | Singer et al. | |
| 2006/0039304 A1 | 2/2006 | Singer et al. | |
| 2006/0041561 A1 | 2/2006 | Singer et al. | |
| 2006/0048187 A1* | 3/2006 | Lubbers et al. | 725/46 |
| 2006/0146765 A1* | 7/2006 | Van De Sluis et al. | 370/338 |
| 2006/0168318 A1 | 7/2006 | Twiss | |
| 2006/0208074 A1* | 9/2006 | Eglen et al. | 235/383 |
| 2006/0218195 A1* | 9/2006 | LaChapelle et al. | 707/104.1 |
| 2006/0242036 A1 | 10/2006 | Walker et al. | |
| 2007/0097885 A1* | 5/2007 | Traversat et al. | 370/254 |
| 2007/0112676 A1* | 5/2007 | Kontio et al. | 705/50 |

FOREIGN PATENT DOCUMENTS

| | | |
|---|---|---|
| WO | WO 2006/023734 A2 | 3/2006 |
| WO | WO 2006/023836 A2 | 3/2006 |
| WO | WO 2006/023837 A2 | 3/2006 |

OTHER PUBLICATIONS

ISR for PCT/US05/29749, Apr. 11, 2006, Time Warner, Inc.

ISR for PCT/US05/29750, Jun. 29, 2006, Time Warner, Inc.

"Download Manager," article retrieved from Wikipedia encyclopedia on Sep. 14, 2007, pp. 1-2.

"Kazaa," article retrieved from Wikipedia encyclopedia on Sep. 14, 2007, pp. 1-8.

ifpi GRid, "New Electronic Identifier Helps Develop Legitimate Online Music Market," Grid Standard: Syntax Grid Handbook, pp. 1-4. Retrieved from http://87.84 226.196/grid/index.html on Sep. 14, 2007.

"Segmented Downloading," article retrieved from Wikipedia encyclopedia on Sep. 14, 2007, pp. 1-3.

Liang, Jia et al. "Understanding KaZaA", Polytechnic University, Dept. of Computer and Information Science, May 6, 2004, pp. 1-9. Retrieved from http://cis.poly.edu/~ross/papers/Understanding KaZaA.pdf on Sep. 14, 2007.

International Preliminary Report on Patentability issued in PCT Application No. PCT/US05/029574, mailed Mar. 1, 2007, pp. 1-6.

\* cited by examiner

METHOD AND DEVICE FOR THE WIRELESS EXCHANGE OF MEDIA CONTENT BETWEEN MOBILE DEVICES BASED ON CONTENT PREFERENCES

BACKGROUND

Peer-to-peer networking has altered the basic notions of how computers share data. In a more traditional data sharing paradigm, computers share information in a structured manner where one computer is a server and another computer is a client. This traditional concept is known as the "client-server" model. Although the manner in which a data transfer takes place is different, peer-to-peer networking and client-sever transactions typically both rely on a ubiquitous computer data network, for example a local area network or a wide area network (e.g. the Internet). One distinguishing characteristic of the peer-to-peer model vis-à-vis the client-server model is that a computer operating in a peer-to-peer configuration is capable of acting both as a client and as a server, depending upon a particular data transaction. For example, when a computer in a peer-to-peer network needs data, that computer can operate as a client. The same computer can also provide data as a server when called upon to do so by another computer communicatively associated with the first computer in a peer-to-peer network.

Peer-to-peer networking has gained wide popularity as a means for sharing files. Peer-to-peer networking is especially popular in those instances when the shared files are media content files, for example audio content and video content files. One aspect of such file sharing is that users are able to specify what files are desired and then search for the files on other computers that are attached to a peer-to-peer network. The standard mechanisms for discovering files in a peer-to-peer network works fairly well because the computers attached to the peer-to-peer network are typically available when a search for a desired file is performed.

With the proliferation of mobile devices, many users of such devices attempt to share files with each other using a wireless connection. For example, a user of a digital music device may want to share a music file with another user. Up until now, both users would need to collaborate with each other to affect the transfer. Cell phone users may want to share ring-tones or photographs. Again, both users would need to agree to the transfer and collaborate to see the transfer through to fruition. The need for such collaboration could be substantially reduced if peer-to-peer networking could be used between wireless devices.

Unfortunately, the notion of peer-to-peer networking breaks down in the realm of wireless devices. One reason for this is the fact that mobile devices maintain only a transient connection with other mobile devices. This is especially true when the mobile devices interact with each other in local networking structures such as Blue Tooth and 802.11 wireless networks that do not bridge over to a wide area network. As such, it is only when two wireless devices are in proximity to each other that a local connection between them can be formed. As such, file sharing through peer-to-peer networking is limited by the short duration and limited bandwidth of a connection established between such devices. In fact, a peer-to-peer network has little chance of operating in a realm where the network is only transiently present because there is simply no means for discovering file resources in the usual peer-to-peer manner. Any attempt to search for a required file would be limited in scope to other wireless devices proximate to the device requesting the file. Another problem with any type of file sharing is that of piracy of copyrighted content. The use of any peer-to-peer networking to share copyrighted files, e.g. music files in the form of MP3, promotes copyright infringement.

SUMMARY

A method of providing an automatic wireless exchange of media content between mobile devices based on content preferences, the method comprising: enabling a first wireless device to recognize a second wireless device; establishing an application-level connection with the second wireless device; utilizing share directive data received from a user of the second wireless device to determine a shareable list of media content files located on the second wireless device; receiving, at the first wireless device, the shareable list of media content files from the second wireless device; determining, at the first wireless device, content preference information; checking each file on the shareable list of media content files for a qualification match against the content preference information to automatically determine, at the first wireless device, a desired list of media content files; and downloading, at the first wireless device, a media content file on the desired list of media content files from the second wireless device, wherein initiation of the media content file downloading is independent of any user input and occurs when: a connection viability threshold is met, the connection viability threshold comprising a signal strength of the application-level connection between the first wireless device and the second wireless device, the signal strength represented by a bit error rate; and a file legitimacy threshold is met, the file legitimacy threshold comprising (i) evaluation of an encoding bit rate of the file and (ii) availability of a digital rights certificate associated with the file; and downloading, at the first wireless device, a file descriptor associated with a media content file on the desired list of media content files from the second wireless device, wherein initiation of the file descriptor downloading is independent of any user input and occurs when (i) the connection viability threshold is not met, or (ii) the file legitimacy threshold is not met.

A device for providing an automatic wireless exchange of media content between mobile devices based on content preferences, the device comprising: a processor configured to execute an instruction sequence; a wireless interface configured to interact with a wireless network; and a memory storing a file cache and one or more instruction sequences including: a peer-to-peer module that, when executed by the processor, minimally causes the processor to: recognize a neighbor wireless device, and establish an application-level connection with the recognized neighbor wireless device using the wireless interface; a file determination module that, when executed by the processor, minimally causes the processor to: utilize share directive data received from a user of the recognized neighbor wireless device to determine a shareable list of media content files located on the recognized neighbor wireless device, receive the shareable list of media content files from the recognized neighbor wireless device, determine content preference information pertaining to a user in communications with the device, and check each file on the shareable list of media content files for a qualification match against the content preference information to automatically determine a desired list of media content files; and a reception module that, when executed by the processor, minimally causes the processor to download a media content file on the desired list of media content files from the recognized neighbor wireless device, wherein initiation of the media content file downloading is independent of any user input and occurs when: a connection viability threshold is met, the connection viability threshold comprising a signal strength of the application-level connection with the recognized neighbor wireless device, the signal strength represented by a bit error rate; and a file legitimacy threshold is met, the file legitimacy threshold comprising (i) evaluation of an encoding bit rate of the file and (ii) availability of a digital rights certificate associated with the file; wherein the reception module, when executed by the processor, further minimally causes the processor to download a file descriptor associated with a media content file on the desired list of media content files from the recognized neighbor wireless device, wherein initiation of the file descriptor downloading is independent of any user input and occurs when (i) the connection viability threshold is not met, or (ii) the file legitimacy threshold is not met.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
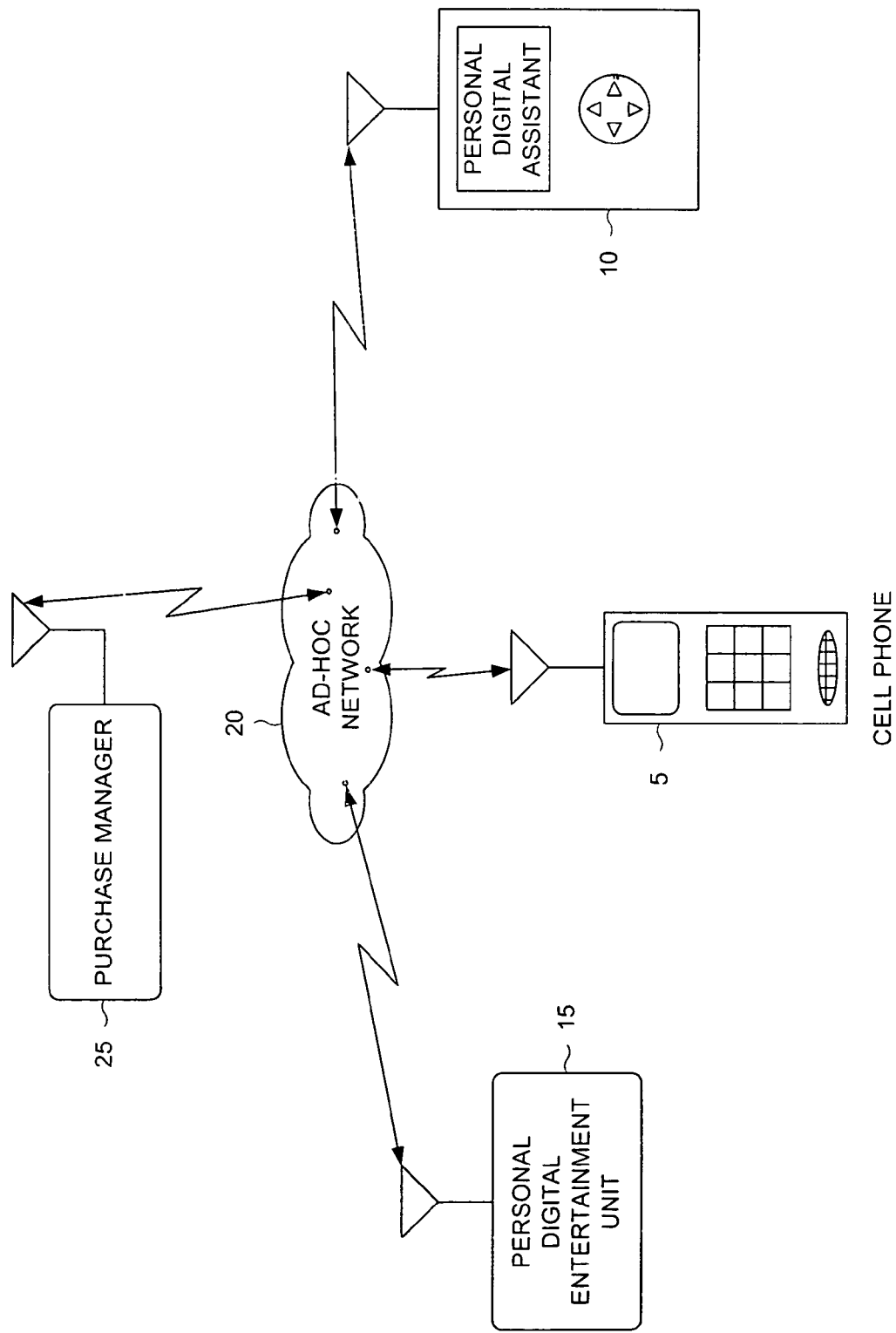
FIG. 1 is a pictorial representation that depicts one illustrative use case wherein the present method is utilized for ad hoc file sharing.

FIG. 1 is a pictorial representation that depicts one illustrative use case wherein the present method is utilized for ad hoc file sharing. Today, there are a plethora of intelligent, wireless devices. These intelligent wireless devices include, but are not necessarily limited to personal digital entertainment units 15, cellular telephones 5 and personal digital assistants 10. Included in each of these example intelligent wireless devices, is a wireless interface enabling the intelligent wireless device to participate in an ad hoc network 20. It should be noted that there are many varied techniques for establishing an ad hoc network 20. From the perspective of this disclosure, an ad hoc network 20 comprises a network that is temporarily established between intelligent wireless devices. In a typical ad hoc networking environment, the ad hoc network is established when one intelligent wireless device perceives a second intelligent wireless device. The two intelligent wireless devices enable the communication of one or more data packets between processes executing in each of the intelligent wireless devices. Also shown in the figure is a purchase manager 25, the function of which is described infra.

The physical structure of intelligent wireless device includes a wireless network interface. One form of a wireless network interface includes an 802.11 wireless networking interface. Another form of a wireless network interface includes a Blue-Tooth interface. Doubtless, continued evolution of intelligent wireless networking will yield yet other forms of wireless network interfaces. It should be noted that the present method can be applied in any wireless networking structure and is not dependent upon any particular form of a wireless network interface.

Figure 2:
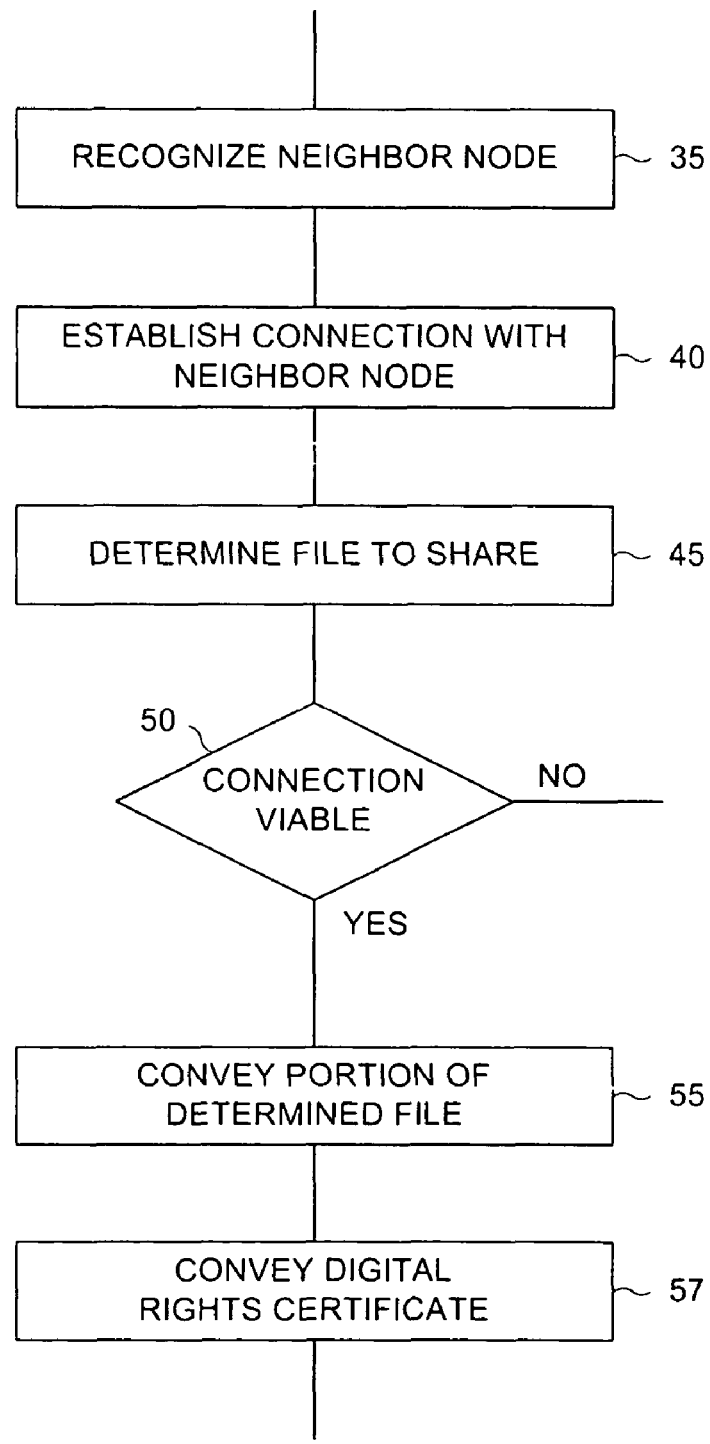
FIG. 2 is a flow diagram that depicts a one illustrative method for sharing a file in an ad hoc manner.

FIG. 2 is a flow diagram that depicts a one illustrative method for sharing a file in an ad hoc manner. According to this illustrative method, a file is shared by first recognizing a neighbor node (step 35) and then establishing a connection with the neighbor node (step 40). The connection can be established with any neighbor node and the present method does not distinguish between a slave and master node ordinarily associated with an ad hoc network 20. Once the connection is established, a particular file to be shared with the neighbor node is determined (step 45). While the connection remains viable (step 50), a portion of the determined file is conveyed to the neighbor node (step 55). FIG. 2 further illustrates that, according to one example variation of the present method, a digital rights certificate is conveyed to the neighbor node (step 57).

Figure 2A:
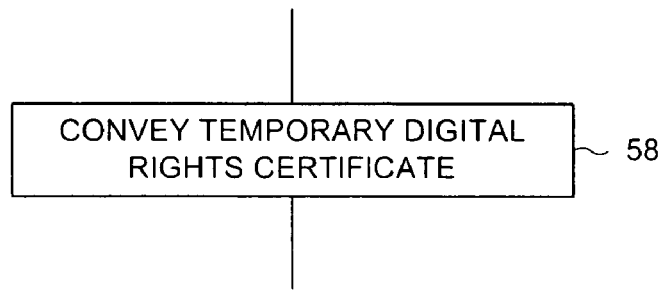
FIG. 2A is a flow diagram that depicts one example alternative method for conveying a digital rights certificate.

FIG. 2A is a flow diagram that depicts one example alternative method for conveying a digital rights certificate. According to this example alternative method, a digital rights certificate is conveyed to a neighbor node in the form of a temporary digital rights certificate. One example of a temporary digital rights certificate includes a use limit indicator wherein the use limit indicator reflects the number of time the temporary digital rights certificate can be used to access a file. Yet another example of a temporary digital rights certificate includes an expiration date indicator wherein the expiration date indicator reflects a date upon which or after which the digital rights certificate is no longer valid.

Figure 2B:
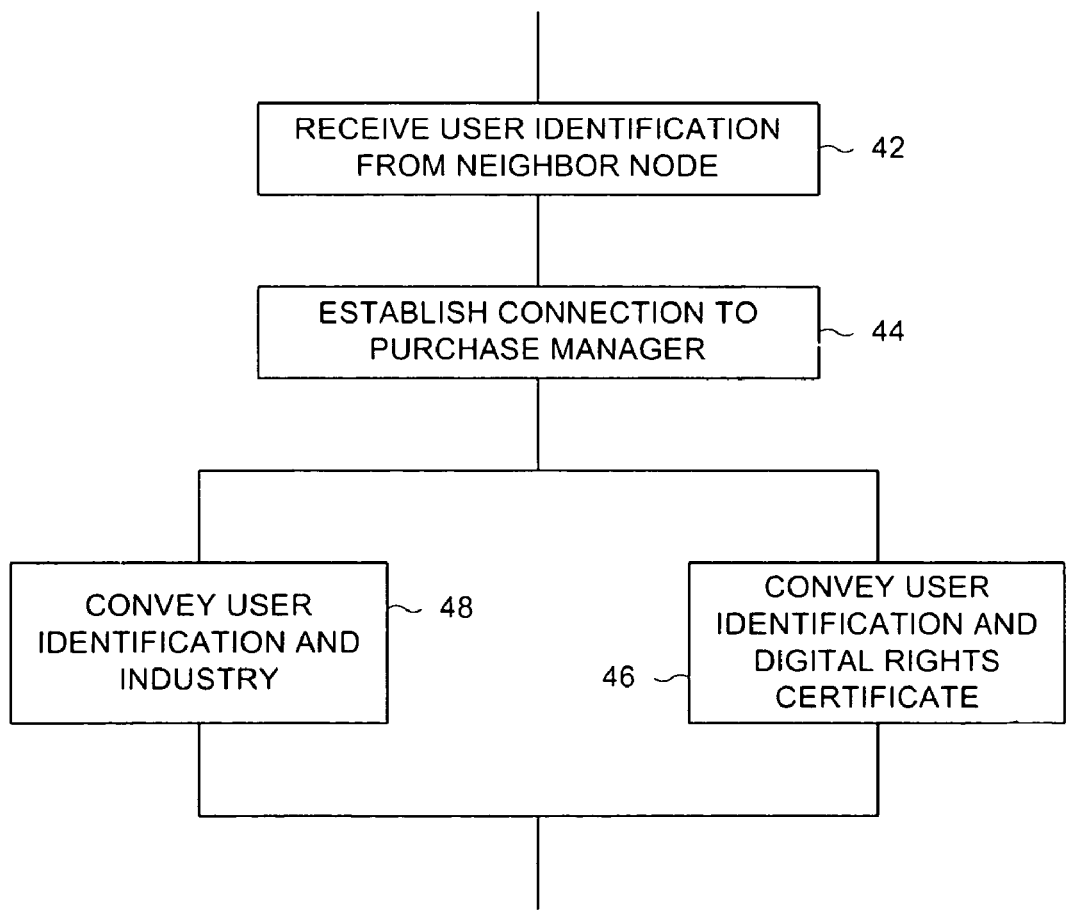
FIG. 2B is a flow diagram that depicts one illustrative alternative method for sharing a file together with facilitating a purchase of the content.

FIG. 2B is a flow diagram that depicts one illustrative alternative method for sharing a file together with facilitating a purchase of the content. According to this example variation of the present method, once a digital rights certificate is conveyed to a neighbor node, a user identifier is received from the neighbor node (step 42). A connection to a purchase manager 25 is established (step 44). The user identifier is then conveyed to the purchase manager along with the digital rights certificate (step 46). In one alternative variation of the present method, an industry standard content identifier (step 48) is conveyed to the purchase manager in lieu of the digital rights certificate. An industry standard content identifier comprises an identifier that can be used to uniquely identify a particular content file.

According to one illustrative use case that is not intended to limit the scope of the claims appended hereto, a first wireless intelligent device (e.g. a personal digital entertainment unit 15) establishes a connection with a second wireless intelligent device of (e.g. a personal digital assistants 10) using an ad hoc networking structure wherein the ad hoc networking structure is established using techniques and methods currently known in the art. The first wireless intelligent device, as depicted in this illustrative use case, then determines which file is to be shared with the second wireless intelligent device. So long as the ad hoc networking structure can be maintained between the first and second wireless intelligent devices, the determined file is conveyed to the second wireless intelligent device.

Figure 3:
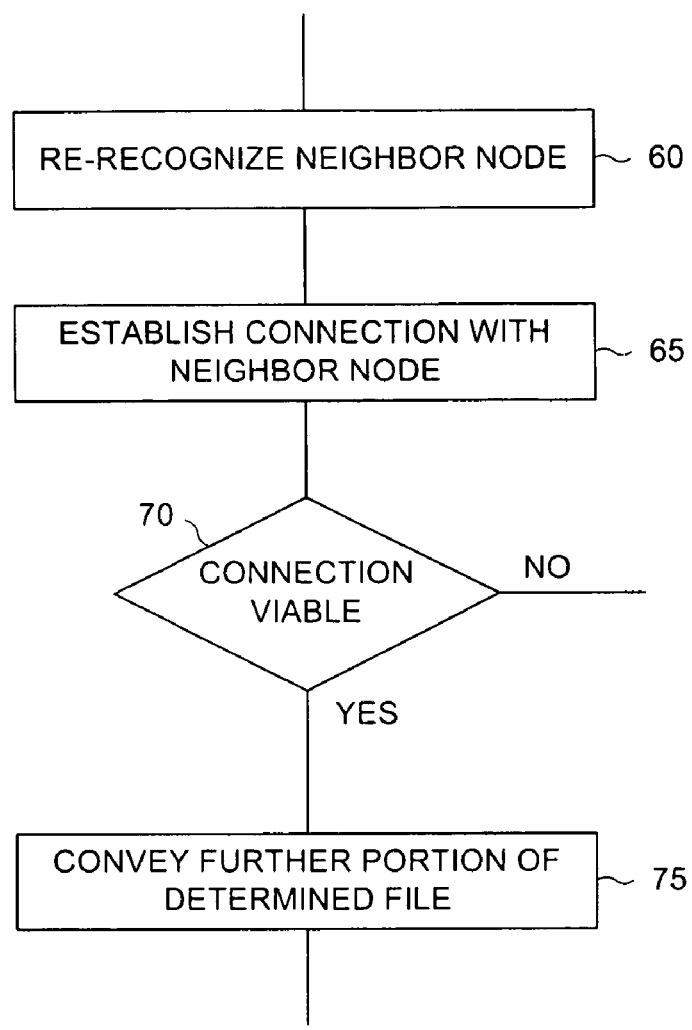
FIG. 3 is a flow diagram that depicts an alternative example method for sharing a file by re-recognizing a neighbor node.

FIG. 3 is a flow diagram that depicts an alternative example method for sharing a file by re-recognizing a neighbor node. Because of the temporal nature of an ad hoc network, a complete conveyance of the determined file may not be accomplished. For example, considering a situation where the first and second wireless intelligent device are initially within close proximity to each other, an ad hoc networking structure can be established between the two devices. However, as the distance between the first and second wireless intelligent devices is increased, signal integrity of the wireless connection between the two devices may be compromised. In this situation, a connection established between the first and second wireless devices will no longer remain viable. In such a situation, it may be inappropriate to abandon the conveyance of the determined file, especially when a new connection might be established between the first and second wireless devices. This situation may occur as the distance between the two intelligent wireless devices is decreased and the signal integrity of the wireless connection between the two devices progressively improves with the closing distance.

In the illustrative use case just presented, this alternative example method provides for sharing a file by re-recognizing the neighbor node (step 60) and then establishing a connection with the neighbor node (step 65). The connection established with the neighbor node as a result of re-recognition of the neighbor node, according to one alternative method, is accomplished by re-establishing a previously non-viable connection. According to yet another alternative method, a new connection is established with the re-recognized neighbor node. In either case, as long as the connection remains viable (step 70), a further portion of the determined file is conveyed to the neighbor node (step 75).

Figure 4:
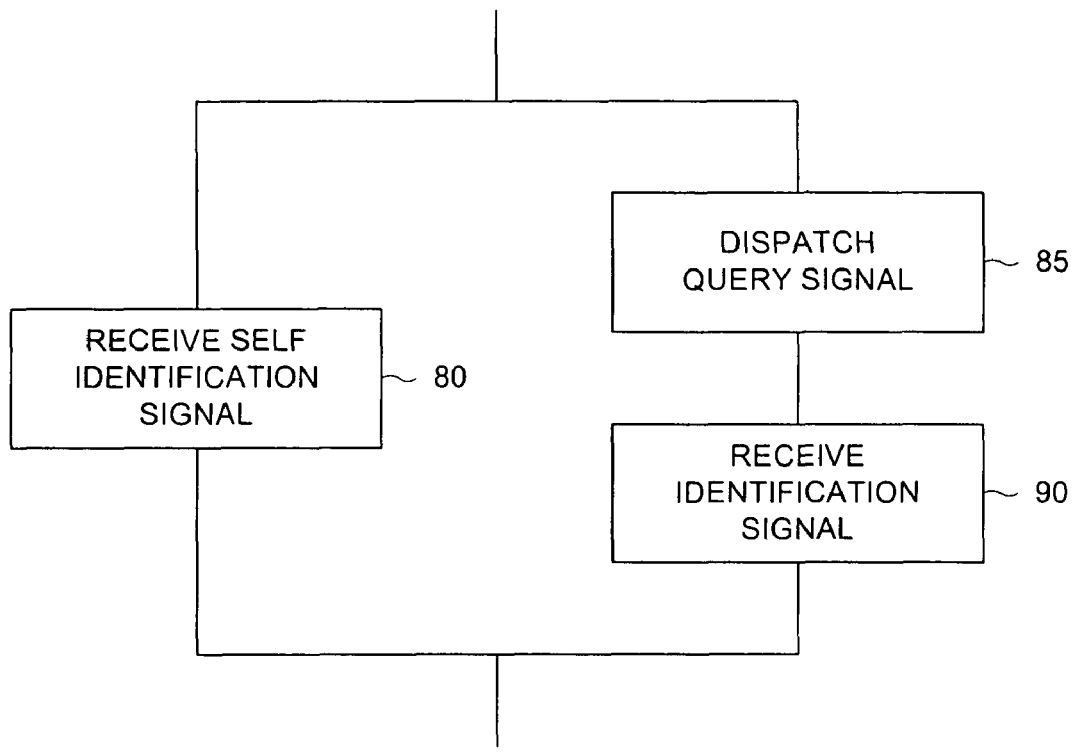
FIG. 4 is a flow diagram that depicts alternative example methods for recognizing a neighbor node.

FIG. 4 is a flow diagram that depicts alternative example methods for recognizing a neighbor node. According to one alternative example method, a neighbor node is recognized when the neighbor node broadcasts a self identification signal. In this situation, recognition of the neighbor node is accomplished by receiving the self identification signal (step 80). According to yet another alternative example method, in neighbor node is recognized by dispatching a query signal (step 85). A neighbor node that receives the query signal, according to this example method, responds by directing identification signal to the node that dispatch that query signal. Accordingly, the neighbor node is recognized by receiving the identification signal (step 90). This alternative example method is useful when the wireless connection between a first and second node is established using an IEEE 802.11 compliant wireless networking interface. As such, at least one variation of the IEEE 802.11 specification provides for a discovery query/response protocol wherein a node recognizes a neighbor node by dispatching a query signal and then waiting for a response from a neighbor node. This alternative example method is also useful when the wireless connection between a first and second node is established using a BlueTooth™ compliant wireless networking interface. As such, at least one variation of the BlueTooth specification provides for a discovery query/response protocol wherein a node recognizes a neighbor node by dispatching a query signal and then waiting for a response from a neighbor node. It should be appreciated that these alternative example methods for recognizing a neighbor node are presented herein as illustrative examples that are not intended to limit the scope of the claims appended hereto.

Figure 5:
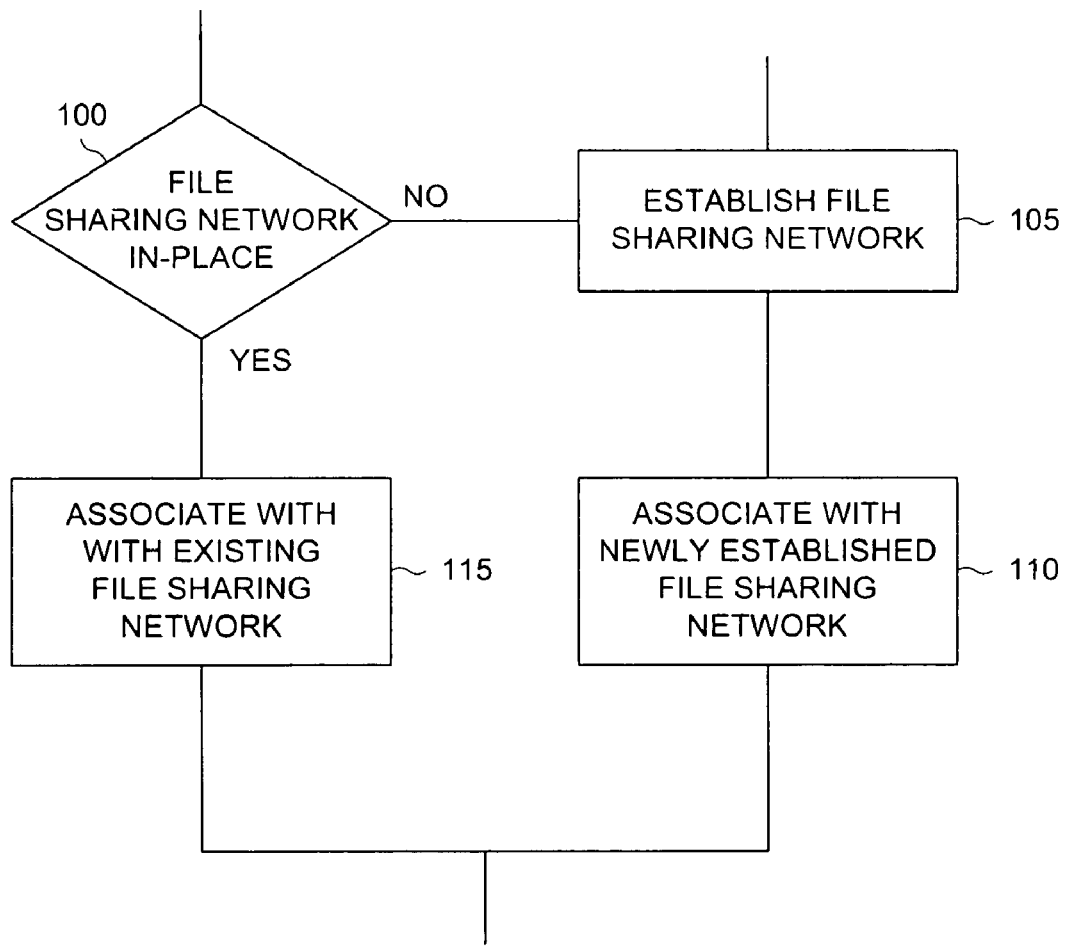
FIG. 5 is a flow diagram that depicts one alternative example method for establishing a connection with a neighbor node by associated with a file sharing network.

FIG. 5 is a flow diagram that depicts one alternative example method for establishing a connection with a neighbor node by associated with a file sharing network. According to this alternative example, a connection is established with a neighbor node by determining if a file sharing network has already been established amongst a plurality of nodes (step 100). For example, two or more intelligent wireless devices may be engaged in a variety of peer-to-peer communications including but not limited to a file sharing application. {EXAMPLE} In the event that a file sharing network is in place, this example method provides for associated with the existing file sharing network (step 115). In the event that a file sharing network has not been established, this example method provides for establishing a file sharing network (step 105) and then associating with the newly established file sharing network (step 110).

Figure 6:
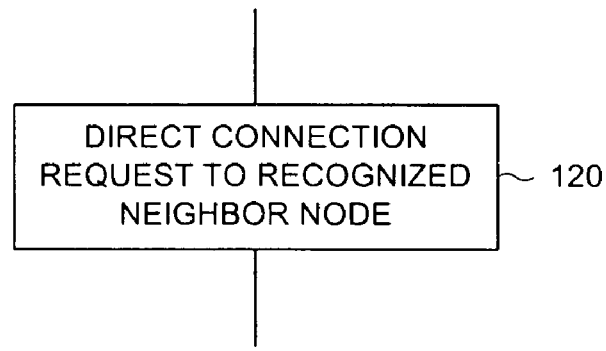
FIG. 6 is a flow diagram that depicts yet another alternative example method for establishing a connection with the neighbor node.

FIG. 6 is a flow diagram that depicts yet another alternative example method for establishing a connection with the neighbor node. According to this alternative example method, a connection request is directed to a recognized neighbor node (step 120). This particular alternative example method is useful when the present method is used to perform ad hoc file sharing by means of a BlueTooth interface. In this situation, a master device directs a connection request to a slave device. The terms "master device" and "slave device" are to be afforded the definitions provided in the BlueTooth interface. The BlueTooth interface is promulgated by the BlueTooth Special Interest Group, Inc. At the time of this writing, the BlueTooth interface has been advanced to version 1.2. It should be noted that the BlueTooth specification is expected to evolve overtime. However, much of the BlueTooth specification that governs the establishment of connections between wireless intelligent devices is expected to remained "backwards compatible" with future versions of the specification. Accordingly, the claims appended hereto are intended to include such future variations of the BlueTooth specification commensurate with the spirit of this disclosure.

Figure 7:
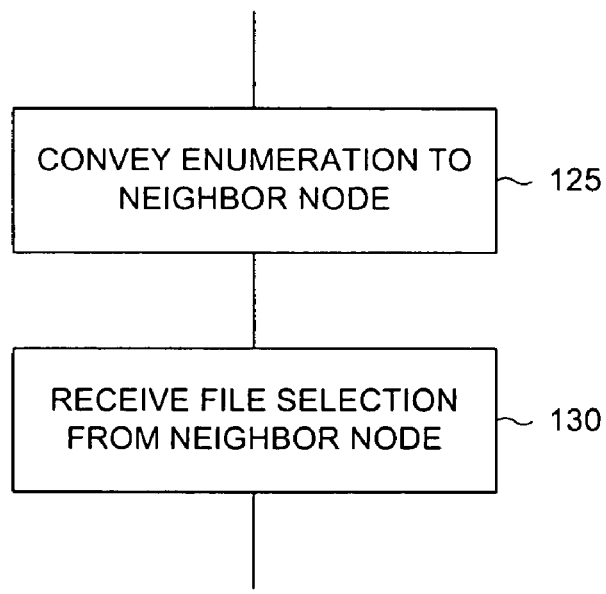
FIG. 7 is a flow diagram that depicts one alternative example method for determining a file to be shared according to a user selection.

FIG. 7 is a flow diagram that depicts one alternative example method for determining a file to be shared according to a user selection. According to this alternative example method, an enumeration of available files is conveyed to a neighbor node (step 125). A neighbor node then select one or more files from the enumeration of available files the neighbor node receives. The neighbor node, according to this example alternative method, conveys a file selection back to a node that is determining which file is to be shared with its neighbor. Accordingly, the file selection is received (step 130) from the neighbor node and used as a basis for determining which one or more files are to be shared with the neighbor node. It should be noted that selection of one or more files, according to yet another variation of the present method, is accomplished by presenting the enumeration of available files to a user that is using the neighbor node. The user of the neighbor node is then notified that such an enumeration has been received and that the user can select one or more files from a presented list.

Figure 8:
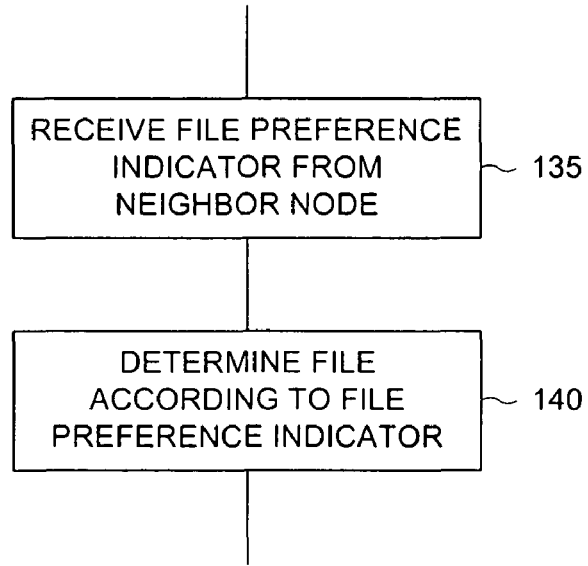
FIG. 8 is a flow diagram that depicts one example method for determining a file to be shared according to a user file preference.

FIG. 8 is a flow diagram that depicts one example method for determining a file to be shared according to a user file preference. According to this alternative example method, a file preference indicator is received from a neighbor node (step 135). The file preference indicator is used to determining one or more files that are to be shared with the neighbor node (step 140). According to yet another variation of the present method, the file preference indicator includes, but is not necessarily limited to a favorite recording artist indicator, a favorite genre indicator and a vintage indicator. It should be noted that these example file preference indicators are presented herein to illustrate the present method and are not intended to limit the scope of the claims appended hereto.

Figure 9:
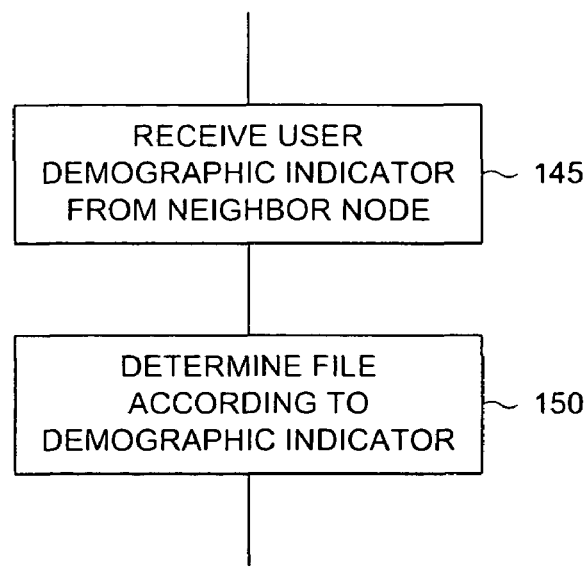
FIG. 9 is a flow diagram that depicts yet another alternative example method for determining a file to be shared according to a user demographic.

FIG. 9 is a flow diagram that depicts yet another alternative example method for determining a file to be shared according to a user demographic. According to this alternative example method, a demographic indicator reflecting the demographics of a user is received from a neighbor node (step 145). The demographic indicator is then used to determine one or more files that are to be shared with a neighbor node (step 150). It should be noted that the demographic indicator received from a neighbor node includes at least one of user gender, user age, residence city, residence states, user income, user race and a user hobby. It should be noted that the claims appended hereto are not intended to be limited in scope to any particular demographic indicator cited herein and that the demographic indicator can be altered in accordance with system requirements.

Figure 10:
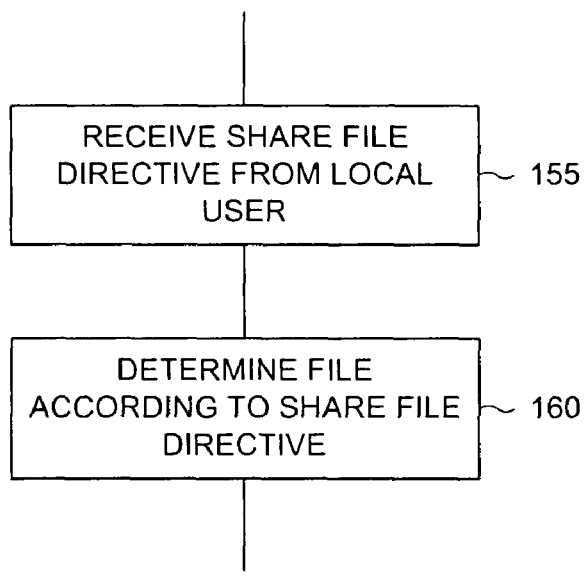
FIG. 10 is a flow diagram that depicts yet another alternative example method for determining a file according to an explicit share directive.

FIG. 10 is a flow diagram that depicts yet another alternative example method for determining a file according to an explicit share directive. An explicit share directive comprises a directive received from a user that is using a node that is determining what file should be shared with a neighbor node. Accordingly, a share file directive is received (step 155) and used to determine a file to be shared with a neighbor node (step 160). An explicit share directive, according to one variation of the present method comprises an enumeration of files available on the node that is determining which files to share with a neighbor node.

Figure 11:
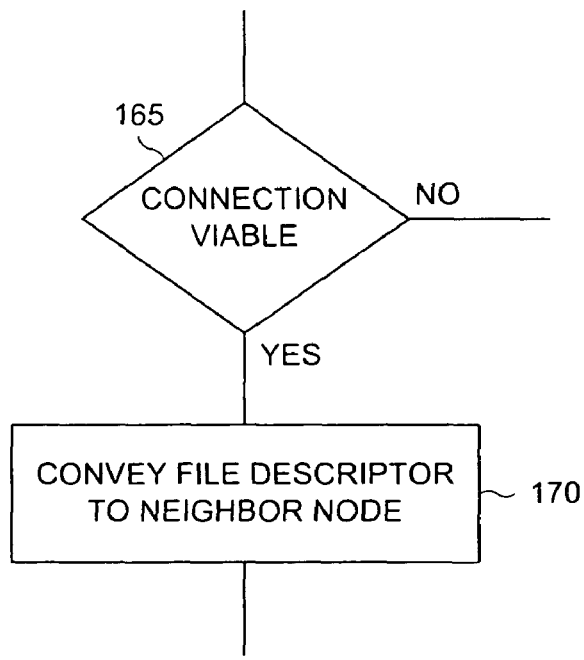
FIG. 11 is a flow diagram that depicts one variation of the present method where a file is shared in the form of a file descriptor.

FIG. 11 is a flow diagram that depicts one variation of the present method where a file is shared in the form of a file descriptor. According to one variation of the present method, a file is shared by sharing a file descriptor (step 170) when a connection is viable (step 165). One example of a file descriptor includes an industry standard content identifier used to uniquely identify a particular media file.

Figure 11A:
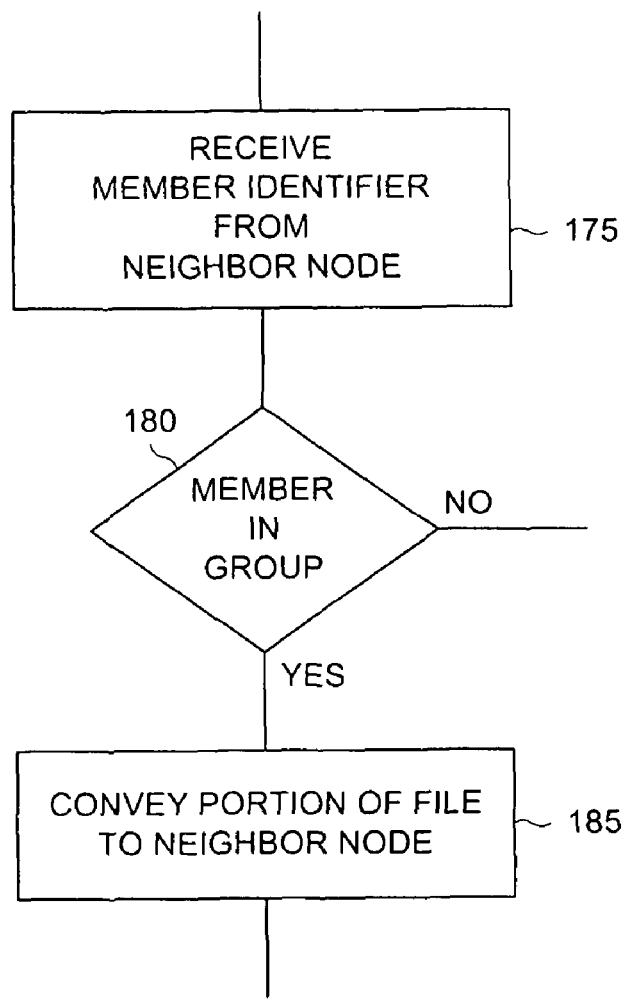
FIG. 11A is a flow diagram that depicts an alternative variation of the present method for determining a file to be shared according to membership in a group

FIG. 11A is a flow diagram that depicts an alternative variation of the present method for determining a file to be shared according to membership in a group. According to this variation of the present method, a member identifier is received (step 175) from a neighbor node. According to one variation of the present method, this is accomplished by receiving member identification by means of an application level connection established with the neighbor node. Once the member identifier is received, a determination is made as to whether or not the user identified by the member identifier is a member of a particular group (step 180). Based on this determination, a portion of a file is conveyed to the neighbor node (step 185) when membership in a particular group is determined.

Figure 12:
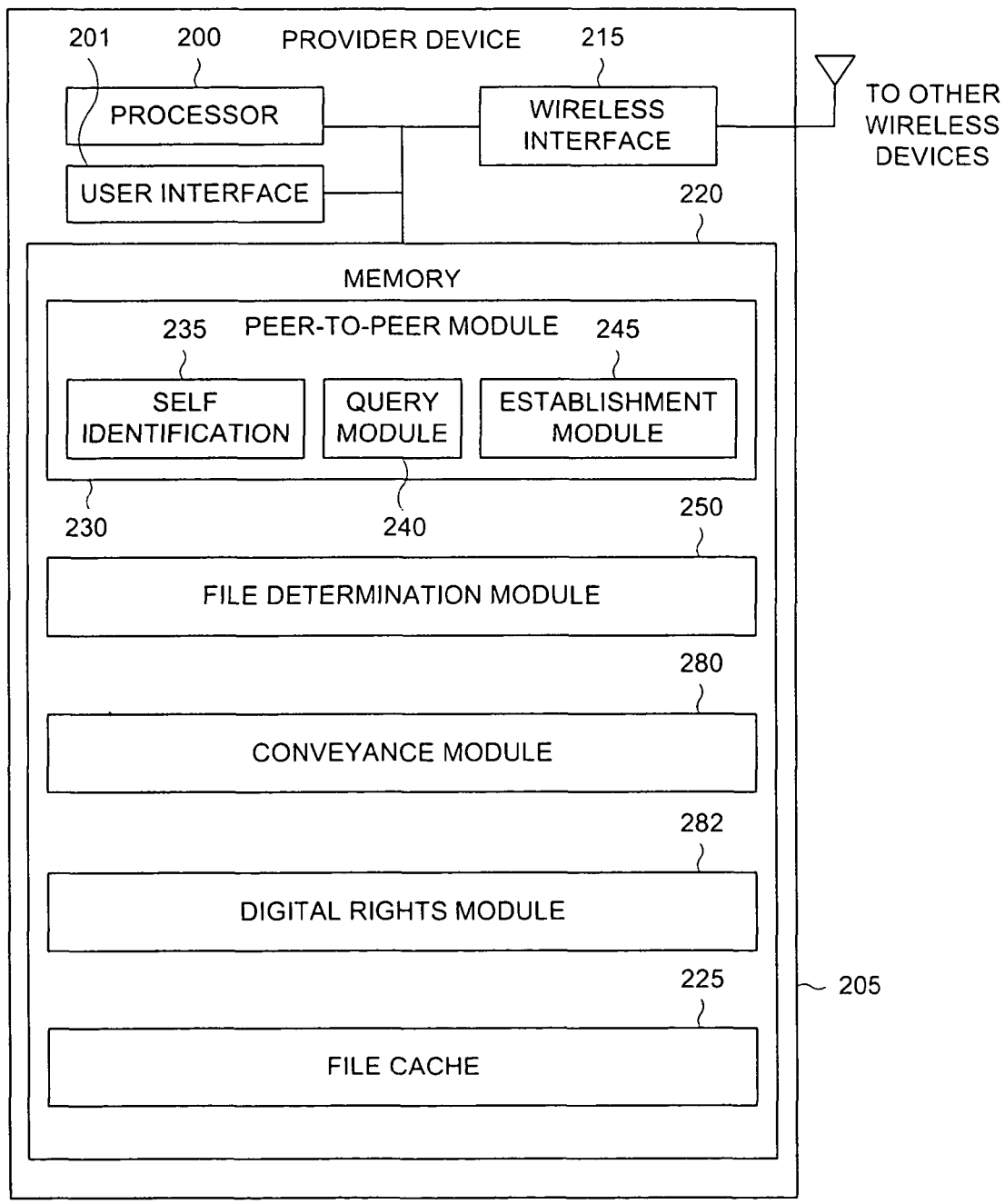
FIG. 12 is a block diagram that depicts one example of embodiment of a wireless file provider device.

FIG. 12 is a block diagram that depicts one example of embodiment of a wireless file provider device. According to this example of embodiment, a wireless file provider device comprises a processor 200, a wireless interface 215 and a memory 220. One alternative embodiment further comprises a user interface 201.

The example embodiment of a wireless file provider device heretofore described further includes various functional modules each of which comprises an instruction sequence that can be executed by the processor. The instruction sequence that implements a functional module, according to one alternative embodiment, is stored in the memory 220. The reader is advised that the term "minimally causes the processor" and variants thereof is intended to serve as an open-ended enumeration of functions performed by the processor as it executes a particular functional module (i.e. instruction sequence). As such, an embodiment where a particular functional module causes a processor to perform functions in addition to those defined in the appended claims is to be included in the scope of the claims appended hereto.

The functional modules (and their corresponding instruction sequences) described thus far that enable wirelessly providing a file are, according to one alternative embodiment, imparted onto computer readable medium. Examples of such medium include, but are not limited to, random access memory, read-only memory (ROM), Compact Disk (CD) ROM, Digital Versatile Disk (DVD), floppy disks, hard disk drives and magnetic tape. This computer readable medium, which alone or in combination can constitute a stand-alone product, can be used to convert a general-purpose computing device into a device for wirelessly providing files wherein said device is capable of providing a file wirelessly according to the techniques and teachings presented herein. Accordingly, the claims appended hereto are to include such computer readable medium imparted with such instruction sequences that enable execution of the present method and all of the teachings herein described.

Stored in the memory 220 of this example embodiment are several functional modules including a peer-to-peer module 230, a file determination module 250 and a conveyance module 280. A digital rights module 282 is also included in one alternative example embodiment and is also stored in the memory 220. It should be appreciated that according to one alternative example embodiment, the peer-to-peer module 230 includes at least one of a self identification module 235, a query module 240 and an establishment module 245.

Figure 13:
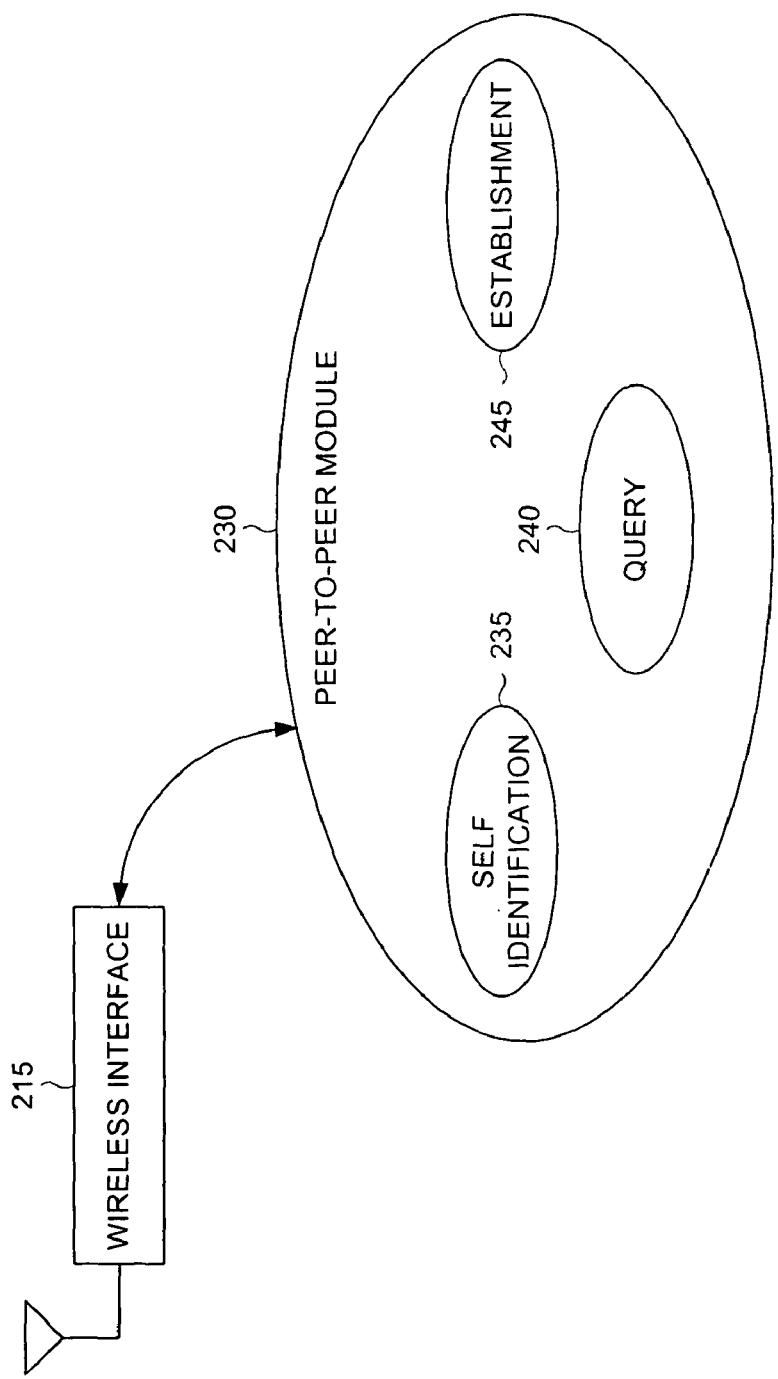
FIGS. 13, 14 and 15 collectively comprise a data flow diagram that illustrates the internal operation of one example of embodiment of wireless file provider device.
Figure 14:
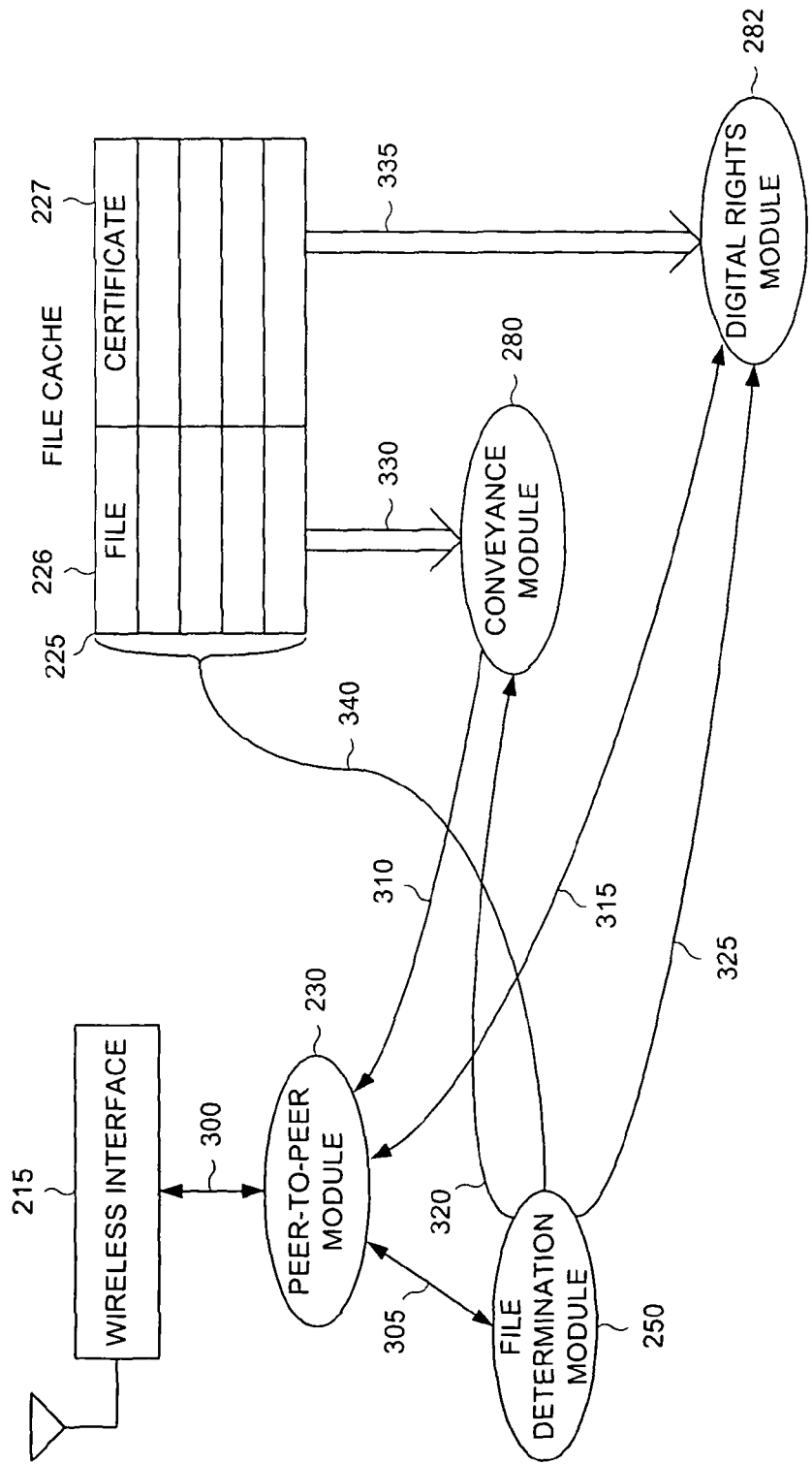
Figure 15:
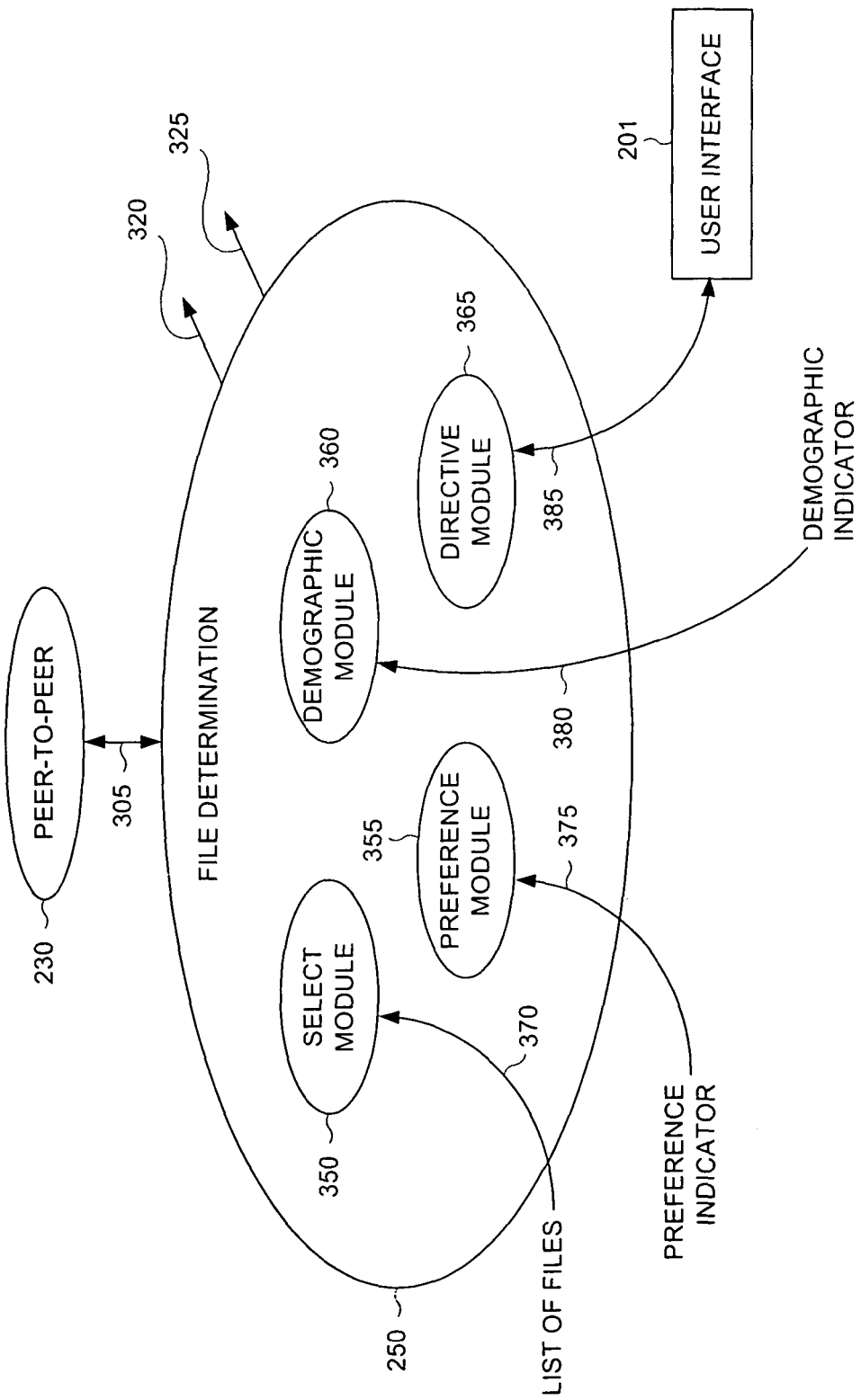

FIGS. 13, 14 and 15 collectively comprise a data flow diagram that illustrates the internal operation of one example of embodiment of wireless file provider device. According to one example embodiment, the peer-to-peer module 230, when executed by the processor 200, minimally causes a processor 200 to recognize a neighbor node and then established connection with recognize neighbor node using the wireless interface 215. The file determination module 250, when executed by the processor 200, minimally causes a processor 200 to determine a file to be shared with recognize neighbor node. The conveyance module 280, when executed by the processor 200, minimally causes the processor 200 to convey a portion of the determine file to the recognized neighbor node. It should be appreciated that the determine file is typically stored in a file cache 225. The file cache 225 is situated in the memory 220.

FIG. 14 illustrates that one example embodiment of a file cache 225 includes storage for a file 226. According to yet another example embodiment, the file cache 225 further includes storage for a digital rights certificate 227 associated with a particular file.

FIG. 13 illustrates that one example alternative embodiment of peer-to-peer module 230 includes a self identification module 235. According to this alternative embodiment, a self identification module 235, when executed by the processor 200, minimally causes the processor 200 to recognize a neighbor node by minimally causes the processor 200 to receive a self-identification signal from the neighbor node by way of the wireless interface 215.

According to yet another alternative embodiment, the peer-to-peer module 230 includes a query module 240. According to this alternative embodiment, the query module 240, when executed by the processor 200, minimally causes the processor 200 to recognize a neighbor node and by minimally causes processor 200 to direct the query message to the wireless interface 215. The processor 200, as it continues to execute the query module 240, waits for an identification signal from the neighbor node, which it receives by way the wireless interface 215.

In yet another alternative embodiment, the peer-to-peer module 230 includes an establishment module 245. According to this alternative embodiment, the establishment module 245 causes the processor 200 to establish a connection with the neighbor node by minimally causes the processor 200 to search for a file sharing network that has been established between two more neighbor nodes. When the processor 200 discovers an existing file sharing network, the processor 200 associates with a file sharing network using the wireless interface 215. In the event that the processor 200 cannot find an existing file sharing network, the processor 200 establishes a new file sharing network him with a neighboring node and associates with the newly established file network using the wireless interface 215. According to yet another alternative embodiment, the establishment module 245, when executed by the processor 200, minimally causes the processor to direct a connection request to the neighbor node using the wireless interface 215. It should be appreciated that the connection request comprises an application-level connection request.

According to yet another illustrative example embodiment, the peer-to-peer module 230, when executed by the processor 200, further minimally causes the processor 200 to re-recognize a neighbor node and establish a connection with the re-recognize the neighbor node. This alternative illustrative example embodiment of the peer-to-peer module 230, when executed by the processor 200, further minimally causes the processor to continue execution of a conveyance module tailored to convey a further portion of a determine file to a connection established with the re-recognized neighbor node. Again, it should be appreciated that the connection established with the re-recognize neighbor node comprises an application-level connection.

FIG. 15 further illustrates that the file determination module 250, when executed by the processor 200, determines which one or more files stored in the file cache 225 are to be shared with a neighbor node. According to one alternative embodiment, the file determination module 250 includes a select module 350. The select module 350, when executed by the processor 200, minimally causes a processor 200 to determine a list of files stored in the file cache 225. Accordingly, the list of files 370 is conveyance to a connection 305 established at an application-level with a neighbor node. It should be appreciated that the peer-to-peer module 230 actually causes the processor 200 to establish the application-level connection with the neighborhood. As the processor 200 continues to execute the select module 350, the select module 350 further minimally causes the processor 200 to receive a file selection from the neighbor node by way of a connection established with the neighbor node by the processor 200 as it executes the peer-to-peer module 230.

According to yet another alternative embodiment, the file determination module 250 includes a preference module 355. The preference module 355, when executed by the processor 200, causes the processor 200 to determine a file that is to be shared with a neighbor node by minimally causes the processor 200 to receive from the neighbor node by way of an application-level connection a file preference indicator 375. It should further be appreciated that the application-level connection is established by the processor 200 as it executes the peer-to-peer module 230. Once the processor 200 receives a file preference indicator, the processor 200, as it continues to execute to the preference module 355, determines a file selection according to the received file preference indicator.

According to yet another alternative embodiment, the file determination module 250 includes a demographic module 360. The demographic module 360, when executed by the processor 200, causes the processor 200 to determine a file that is to be shared with a neighbor node by minimally causes the processor 200 to receive from the neighbor node by way of an application-level connection a demographic indicator 380. It should further be appreciated that the application-level connection is established by the processor 200 as it executes the peer-to-peer module 230. Once the processor 200 receives a demographic indicator, the processor 200, as it continues to execute to the preference module 355, determines a file selection according to the received demographic indicator.

In yet another alternative example embodiment, the file determination module 250 includes a directive module 365. The directive module 365, when executed by the processor 200, minimally causes the processor to determine a file to be shared with a neighbor node by minimally causes the processor to receive a file shared directive from a local user. This is accomplished when the processor 200, as continues to execute the directive module 365, receives 385 a file directive from the user interface 201 included in this alternative example embodiment.

Figure 15A:
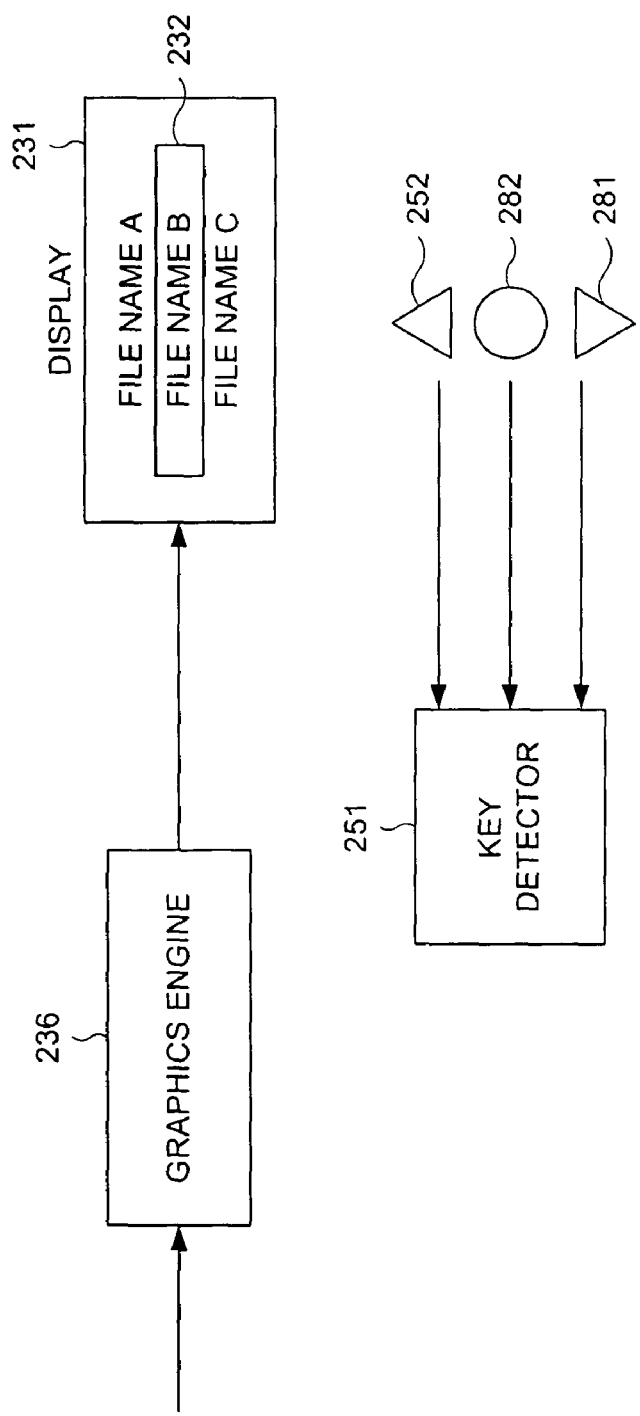
FIG. 15A is a block diagram that depicts one example embodiment of the user interface.

FIG. 15A is a block diagram that depicts one example embodiment of the user interface. According to this example embodiment, the user interface comprises a graphic engine 236, a display 231, a plurality of user keys and a key detector 251. The plurality of user keys in this alternative example embodiment includes an up-arrow key 252, a down-arrow key 281 and a select key 282. In operation, the processor 200 continues to execute the directive module 365 in order to direct a list of file names to the graphics engine 236. The graphics engine 236 then presents the list of file names on the display 231. A user can use the plurality of user keys in order to move a filename highlight 232. Once the user has moved the filename highlight 232 to a particular filename presented on the display 231, the user can select that particular filename using the select key 282. It should be appreciated that activity of the plurality of user keys is detected by the key detector 251 and propagated to the processor 200 as it continues to execute the directive module 365.

FIG. 15 further illustrates that once the file determination module 250 determines a file to be shared with a neighbor node, it to direct its own or more file names 320 to the conveyance module 280. The conveyance module 20, when executed by the processor 200, causes the processor to convey portion of a determined file by minimally causes the processor 200 to retrieve 330 a file from the file cache 225. The conveyance module 200 a further minimally causes the processor to direct 310 a portion of the file to be shared with a neighbor node to the peer-to-peer module 230. The peer-to-peer module 230 then directs a portion of the file to an application-level connection 300 established by the processor 200 as it executes the peer-to-peer module 230. It should be appreciated that the processor 200, as it executes the peer-to-peer module 230, maintains the application-level connection 300 with a neighbor node by means for wireless interface 215. A according to yet another alternative embodiment, the convey specialty latter-day, when executed by the processor 200, minimally causes the processor 200 to convey a file descriptor to a neighbor node in lieu of a portion of a determined file. Such a file descriptor, according to one alternative embodiment, comprises an industry standard media descriptor than can be used to unambiguously identify a particular content file.

FIG. 15 further illustrates that, according to one alternative embodiment, the wireless file provider device 205 further includes a digital rights module 282. The digital rights module 282, when executed a processor 200, minimally causes the processor to convey to a connection established with a recognized neighbor node in digital rights certificate for a particular file (i.e. a file determined by the file determination module 250). Accordingly, digital rights module 282, when executed by the processor 200, retrieves 335 a digital rights certificate from the file cache 225. Accordingly, the file cache 225 to do this alternative embodiment includes a certificate field 227 that is used to store a data rights certificate corresponding to particular file stored in the file field 226 included in the file cache 225. According to one alternative embodiment, the digital rights certificate comprises a temporary digital rights certificate. Examples of a temporary digital rights certificate includes, but is not limited to a digital rights certificate that expires a particular point in time and a digital rights certificate that expires after a pre-established number of uses, both of which have been previously described herein.

According to yet another alternative example embodiment, the digital rights module 282, when executed by the processor 200, minimally causes the processor 200 to receive a user identifier from the neighbor node by way of an application-level connection. According to this alternative embodiment of a digital rights module 282, the digital rights module 282 further minimally causes the processor 200 to establish a connection with a purchase manager using the wireless interface 215. It should be appreciated that a connection established with a neighbor node, according to one alternative embodiment, uses an ad-hoc network established using a short-range wireless interface as heretofore described. It should further be appreciated that a connection established with a purchase manager, according to yet another alternative embodiment, is established by the processor 200 using at least one of a short-range wireless interface (e.g. BlueTooth or 802.11) and a cellular data network (e.g. a G3 data network). In other words, a user identifier can be received from the neighbor node by way of a short-range wireless interface. A file or a digital rights certificate can also be conveyed to a neighbor node using the short-range wireless interface. Connection to the purchase manager, on the other hand, can be accomplished using either of the short-range wireless interface or a cellular data network. For example, a purchase manager may be within the range of the short-range wireless interface included in one embodiment of a device for providing a file according to the techniques and teachings described herein. A purchase manager that does not fall within the range of the short-range wireless interface included in one embodiment of a device for providing a file according to the techniques and teachings described herein can, in the alternative, be contacted by means of a cellular data network. These examples of different types of networks that can be used to establish a connection with a purchase manager are intended to illustrate the present method and apparatus and are not intended to limit the scope of the claims appended hereto.

Once a connection is established to a purchase manager, the user identifier is conveyed to the purchase manager using the establish connection. In conjunction with the user identifier, at least one of the digital rights certificate and an industry standard content identifier are conveyed to the purchase manager using the establish connection. The purchase manager can then determine whether or not the user associated with a received user identifier is privileged to use to particular content file. In one example embodiment, the purchase manager makes such a determination by correlating the digital rights certificate to a particular content file. In another example embodiment, the purchase manager makes such a determination directly according to the received industry standard content identifier. It should be further appreciated that the purchase manager has associated with a particular user identifier an account standing. The account standing is used to determine the creditworthiness of the particular user associated with the user identifier received by the purchase manager.

According to one alternative embodiment, the conveyance module 280 minimally causes the processor 200 to convey a portion of a file to a neighbor node by minimally causing the processor 200 to receive a user identifier from a neighbor node. This is accomplished by receiving a user identifier from the neighbor node using a connection established at an application level by the processor 200 as it continues to execute the peer-to-peer module 230. Once the member identifier is received, the processor 200, as it continues to execute the conveyance module 280, further minimally determines if the member identifier is associated with a particular group. When the member identifier is associated with a particular group, then a portion of a file is retrieved from the file cache 226 and conveyed to the neighbor node using a connection established therewith by the processor as it continues to execute the peer-to-peer module 230.

Figure 16:
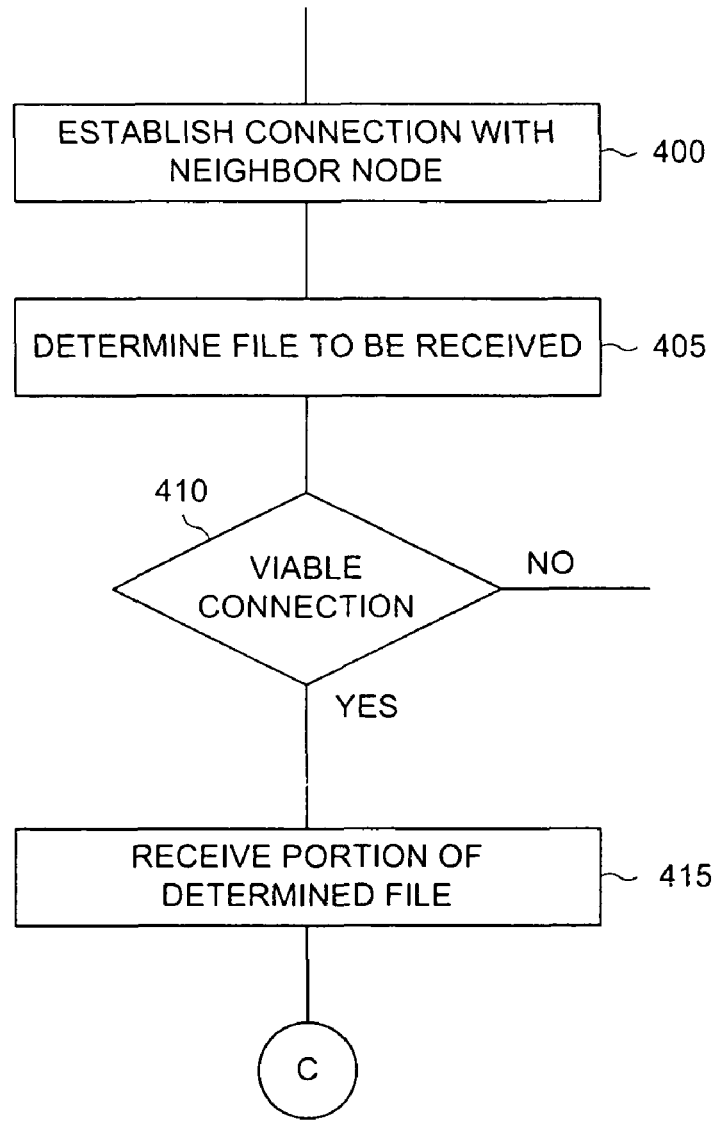
FIG. 16 is a flow diagram that depicts one example method for receiving a file from a neighbor node.

FIG. 16 is a flow diagram that depicts one example method for receiving a file from a neighbor node. According to this example method, a file is received from a neighbor node by establishing a connection with the neighbor node (step 400), determining a file to be received from the neighbor node (step 405) and receiving a portion of the determined file (step 415) so long as a connection remains viable (step 410). It should be appreciated that the connection established with the neighbor node comprises an application-level connection. For example, a file receiver application in a local node (i.e. a node that receives a file) establishes an application-level connection to a file provider application executing in the neighbor node (i.e. a node that provides a file).

Figure 17:
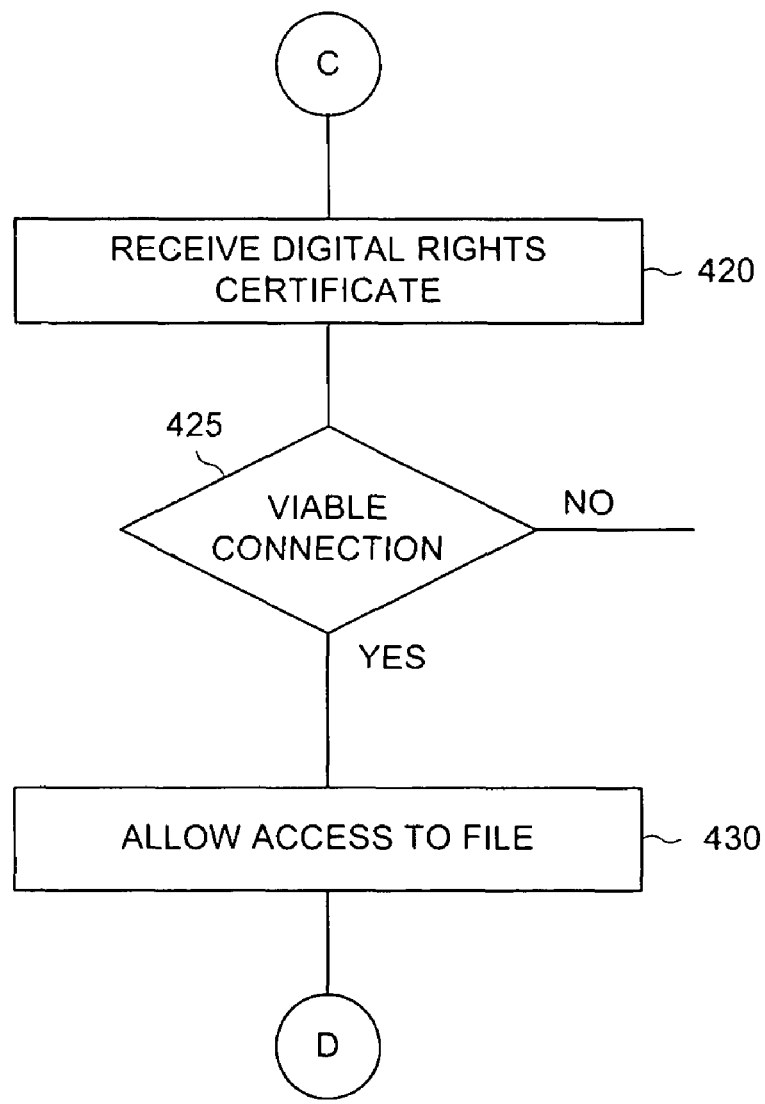
FIG. 17 is a flow diagram that depicts an example method for receiving a file with a corresponding digital rights certificate.

FIG. 17 is a flow diagram that depicts an example method for receiving a file with a corresponding digital rights certificate. According to this variation of the present method, a digital rights certificate is also received (step 420) from the neighbor node. The digital rights certificate can be received before or after a portion of a determined file. According to this variation of the present method, access to the file is allowed (step 430) when a digital rights certificate is valid (step 425). As such, the file can be used by a local user so long as the digital rights certificate remains valid. For example, the received file can include an audio media file and a video media file. An audio or video media player included in a local node (i.e. the node that received a file from a neighbor node) would only be allowed to access the audio or video media file so long as the digital rights certificate remains valid.

Figure 18:
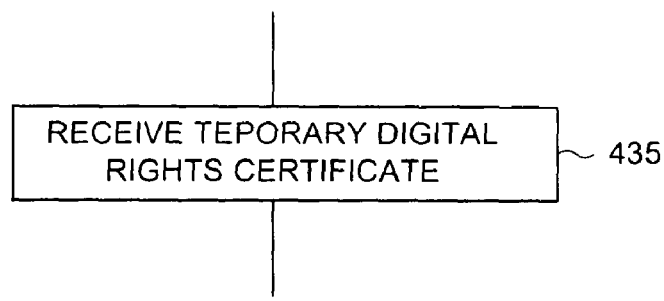
FIG. 18 is a flow diagram that depicts an alternative method wherein a temporary digital rights certificate is received.

FIG. 18 is a flow diagram that depicts an alternative method wherein a temporary digital rights certificate is received. The digital rights certificate, according to another variation of the present method, comprises a temporary digital rights certificate for a file received from the neighbor node. In this variation of the present method, the step of receiving a digital rights certificate comprises receiving a temporary digital rights certificate (step 435).

Figure 19:
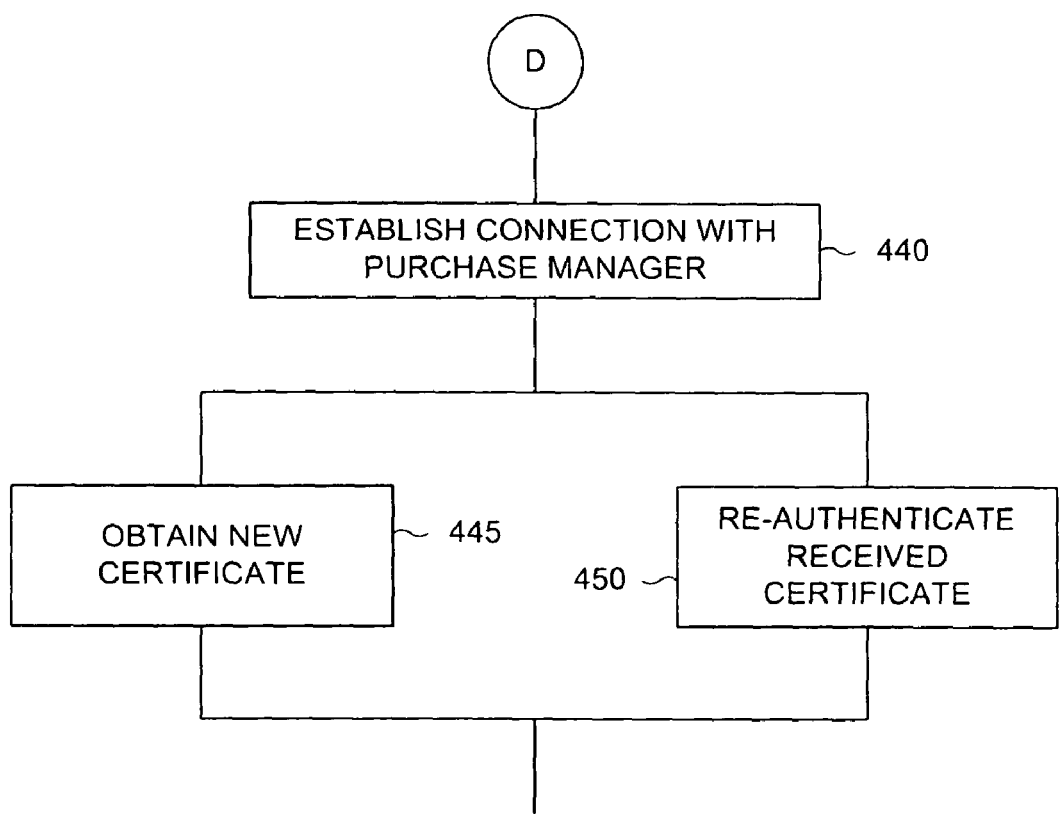
FIG. 19 is a flow diagram that depicts one alternative method for maintaining the validity of a digital rights certificate.

FIG. 19 is a flow diagram that depicts one alternative method for maintaining the validity of a digital rights certificate. According to this alternative method, a digital rights certificate received from a neighbor node may have a limited life. In this situation, it is necessary to establish a connection with a purchase manager (step 440). The connection with the purchase manager, according to one variation of the present method, is established by means of an ad hoc network is illustrated in FIG. 1. In yet another variation of the present method, the connection with the purchase manager is established over a wide area wireless network, for example a G3 network. It should be appreciated that any type of wide area wireless network can be used to establish a connection with the purchase manager and any examples presented herein are intended to illustrate the present method and should not be construed as limiting the scope of the claims appended hereto.

Once a connection with the purchase manager is establish, one example variation of the present method provides for obtaining a new digital rights certificate (step 445) for a particular file received from the neighbor node. For example, a digital rights certificate received from the neighbor node by means of an application-level connection can be "traded in" for a new digital rights certificate. According to yet another variation of the present method, an existing digital rights certificate is re-authenticated. One example of re-authenticating an existing digital rights certificate includes, but is not limited to removing any life-limiting restrictions exhibited by the existing digital rights certificate. Life-limiting restrictions exhibited by a digital rights certificate include, but are not limited to an expiration date and a use-limit. It should be appreciated that, according to yet another variation of the present method, the steps of either obtaining a new digital rights certificate or re-authenticating an existing digital rights certificate is further augmented or preceded by a step for arranging a payment that corresponds to an obtained digital rights certificate or to re-authentication of an existing digital rights certificate.

Figure 20:
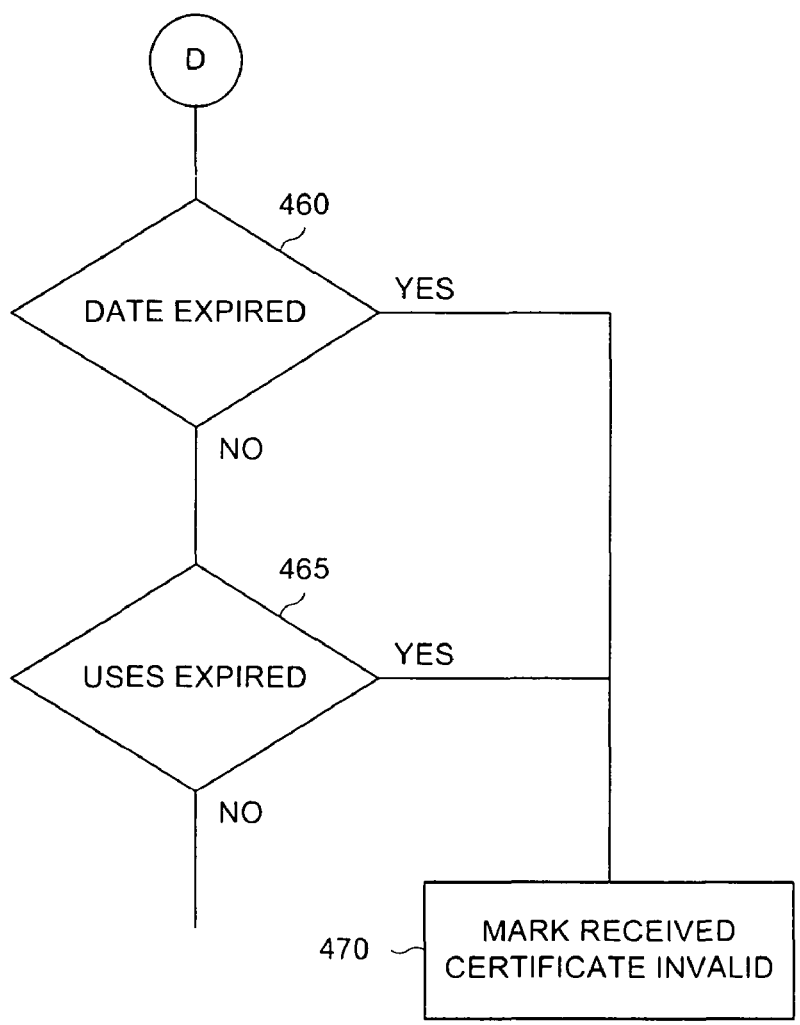
FIG. 20 is a flow that depicts one example method for marking as invalid a temporary digital rights certificate.

FIG. 20 is a flow that depicts one example method for marking as invalid a temporary digital rights certificate. According to one variation of the present method, in digital rights certificate that is received from a neighbor node is marked as invalid (step 470). According to yet another variation of the present method, this is accomplished when a current date is greater than an expiration date included in the certificate (step 460). It's accordingly, the digital rights certificate includes an expiration date. According to yet another variation of the present method, the digital rights certificate is marked as invalid (step 470) afterward certificate has been used more than a pre-established number of times. Accordingly, the digital rights certificate includes a use-counter this decremented every time to digital rights certificate is used to access a file received from a neighbor node.

Figure 21:
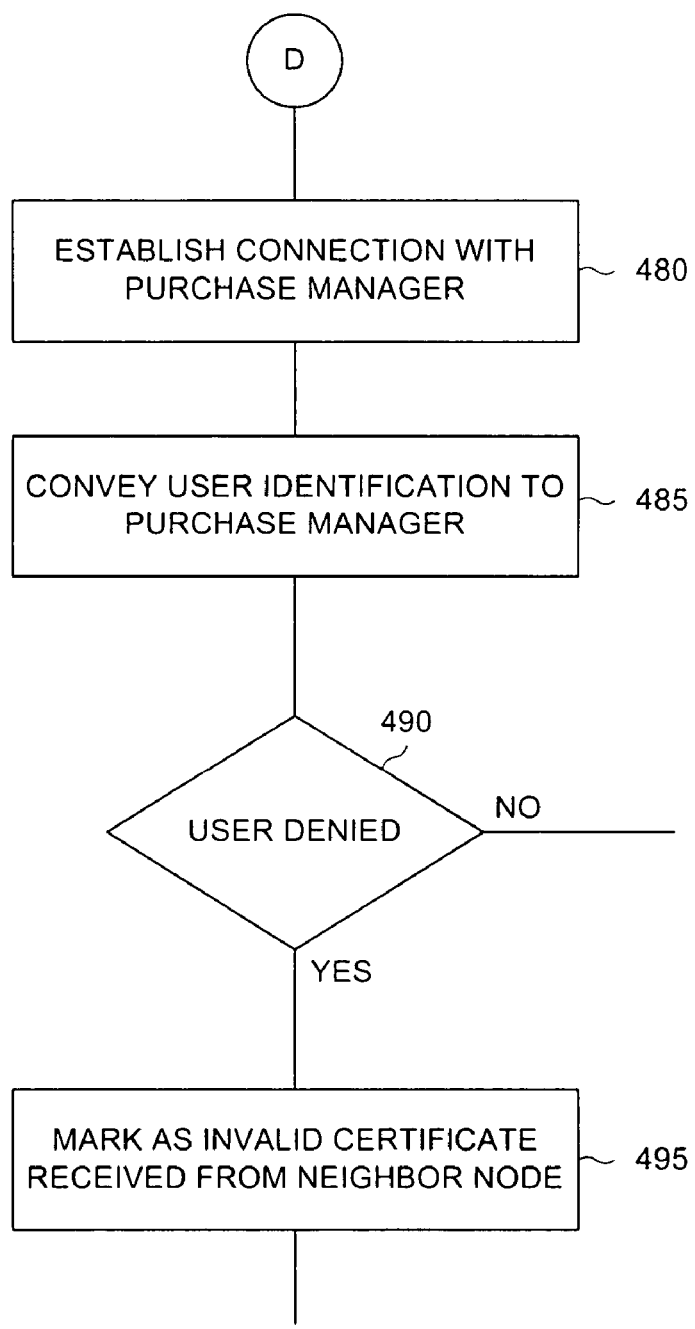
FIG. 21 is a flow diagram that depicts yet another alternative method for marking as invalid a digital rights certificate according to user identifier.

FIG. 21 is a flow diagram that depicts yet another alternative method for marking as invalid a digital rights certificate according to user identifier. According to this variation of the present method, a connection is established with a purchase manager (step 480). It should be appreciated that, according to one illustrative variation of the present method, the connection to a purchase manager is established through an ad hoc network. Such an ad hoc network, according to yet another variation of the present method, is established using a local short-range wireless interface. According to yet another variation of the present method, the connection to purchase measures established using a cellular data network such as a G3 network. It should be appreciated that these example techniques for establishing a connection to a purchase manager are intended to illustrate the present method and should not be construed as limiting the scope of the claims appended hereto.

Once a connection is established to the purchase manager, a user identifier is conveyed to the purchase manager (step 485). The digital rights certificate received from the neighbor node that corresponds to particular file received from that neighbor node is marked as invalid when a user-specific denial is received from the purchase manager away the connection established thereto.

Figure 22:
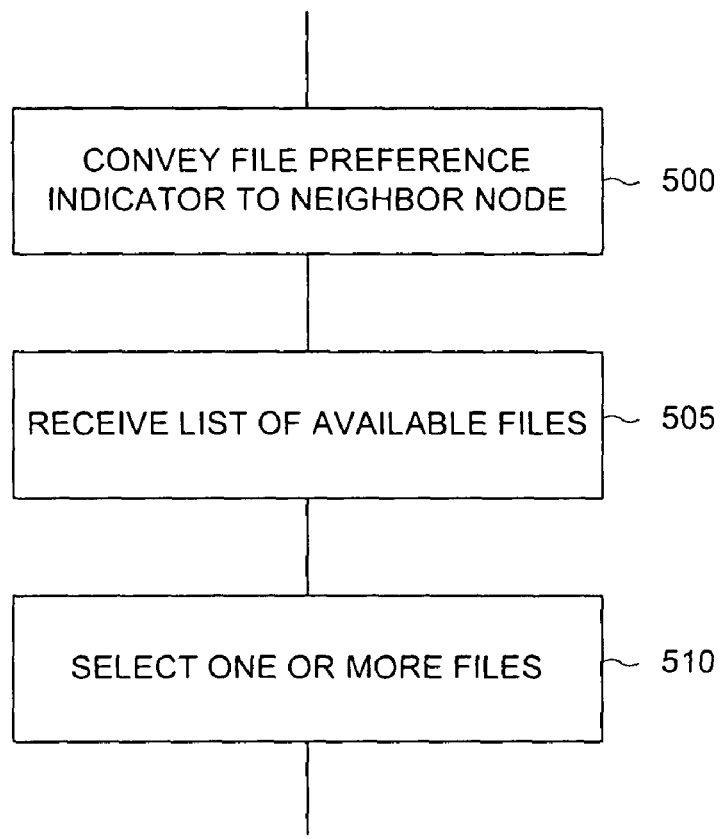
FIG. 22 is a flow diagram that depicts one example method for determining a file to the received from a neighbor node according to a file preference indicator.

FIG. 22 is a flow diagram that depicts one example method for determining a file to the received from a neighbor node according to a file preference indicator. According to this example variation of the present method, a node determines which file to be received from the neighbor node by containing a file preference indicator to the neighbor node (step 500). It should be appreciated that the file preference indicator is conveyed to the neighbor node using an application-level connection established with the neighbor node. It should be appreciated that the neighbor node will use the file preference indicator to select one or more files that may be of interest to node from which the file preference indicator was received. Accordingly, a list of available files is received from the neighbor node (step 505). As such, one or more files is selected (step 510) from the list of available files received from the neighbor node.

Figure 23:
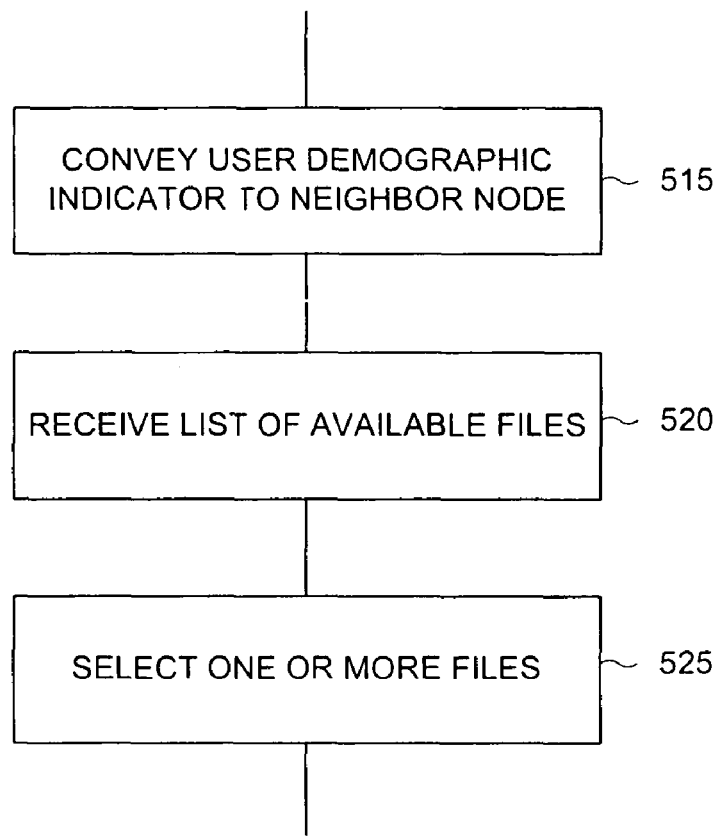
FIG. 23 is a flow diagram that depicts an alternative method of determining which file is to be received from a neighbor node by means of a demographic indicator.

FIG. 23 is a flow diagram that depicts an alternative method of determining which file is to be received from a neighbor node by means of a demographic indicator. According to one example variation of the present method, the demographic indicator is conveyed to a neighbor node (step 515). The neighbor node will typically use the demographic indicator to select or more files that may be of interest to node from which the demographic indicator was received. Accordingly, a list of available files is received from the neighbor node (step 520). As such, or more files is selected (step 525) from the list of available files received from the neighbor node.

Figure 24:
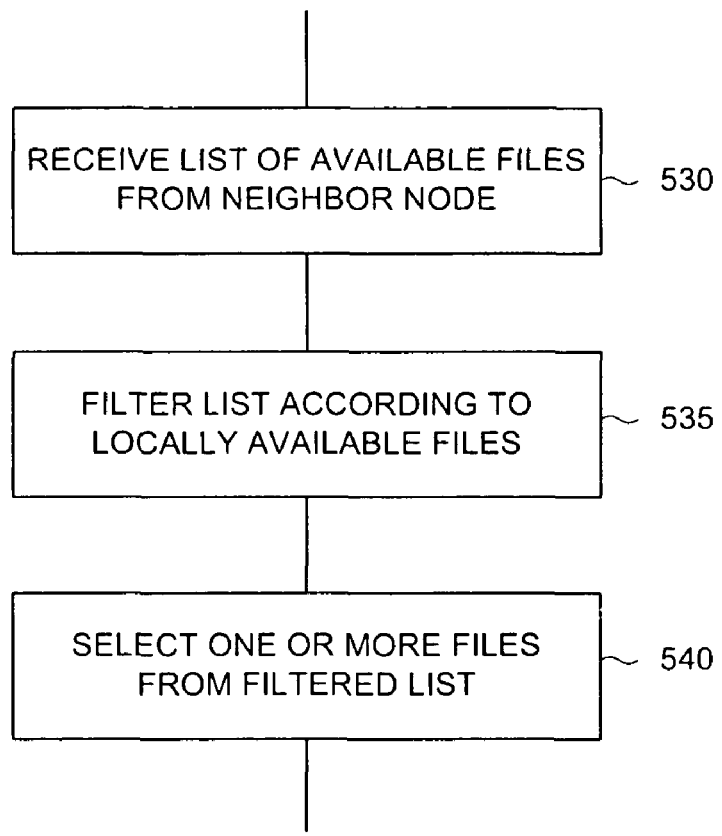
FIG. 24 is a flow diagram that depicts an alternative method for determining which file is to be received from the neighbor node according to an enumeration of locally available files.

FIG. 24 is a flow diagram that depicts an alternative method for determining which file is to be received from the neighbor node according to an enumeration of locally available files. It should be appreciated that to particular node may have stored within its some number (i.e. one or more) files. There's little utility to receive a file from the neighbor node when the files are a stored within local node. Accordingly, one variation of present method provides for receiving a list of available files from a neighbor node (step 530). The list of available files received from the neighbor node is filtered according to an enumeration of locally available files (step 535). One or more files are than selected from the filtered list (step 540).

Figure 25:
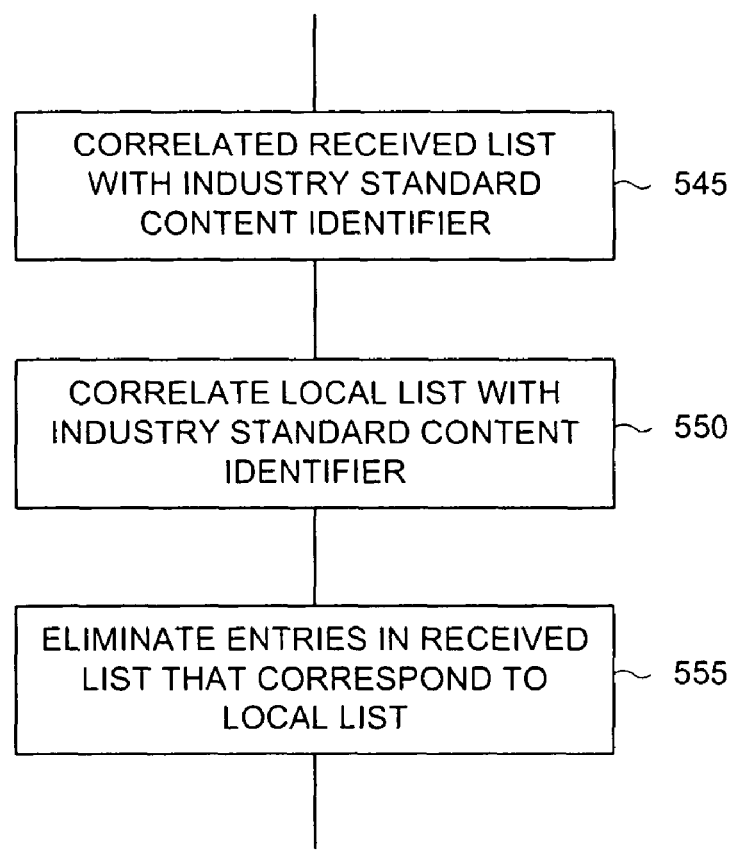
FIG. 25 is a flow diagram that depicts one example method for filtering a list of files available on the neighboring node.

FIG. 25 is a flow diagram that depicts one example method for filtering a list of files available on the neighboring node. According to one example variation of the present method, the list of files available on the neighboring node is filtered according to an enumeration of the files available in a local node by first correlating the received list of files available on a neighbor node with an industry standard content identifier (step 545). This can be accomplished in several ways. For example, one variation of the present method provides for scanning the filename for various attributes including, but not limited to a content title, a publisher and an artist. In many instances, a filename included in a list of files available on the neighbor node to one or more of such attributes. Accordingly, one or more of these attributes can be correlated with an industry standard content identifier. This correlation technique can then be applied to a list of locally available files (step 550). Accordingly, a correlation can be established between a file stored in a local node and an industry standard content identifier. The correlated results from the list of files received from a neighbor node and a list of locally available files are used to eliminate entries (step 555) in the list received from the neighbor node that correspond to entries in the list of locally available files.

Figure 26:
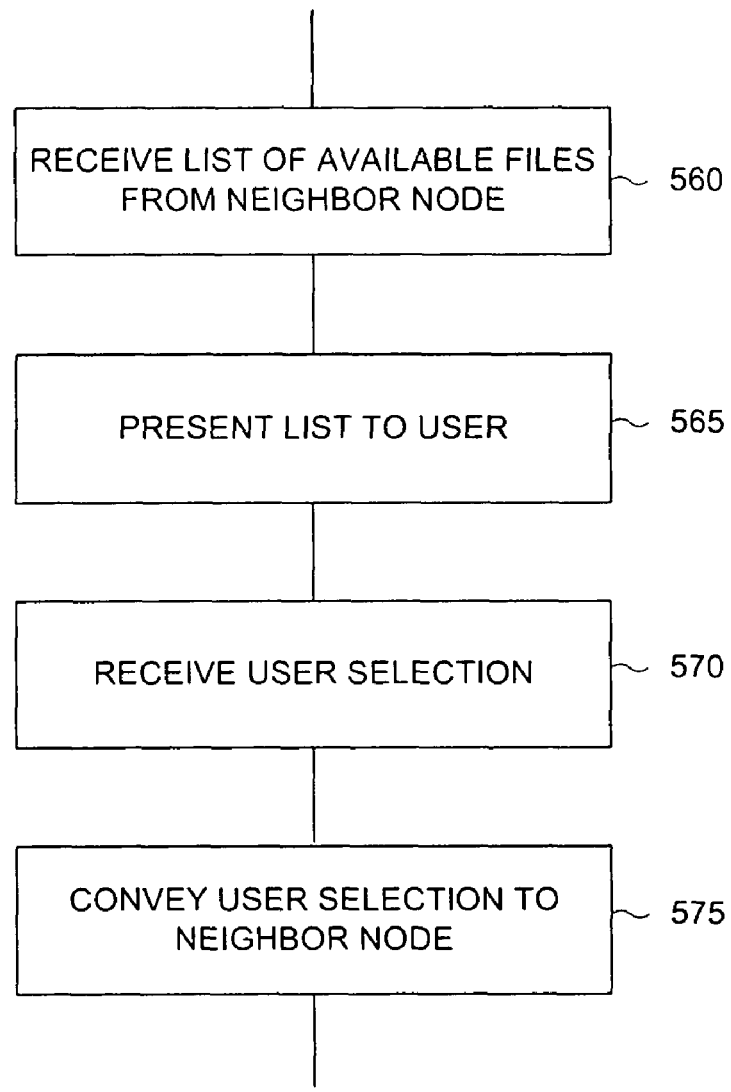
FIG. 26 is a flow diagram that depicts one example method for determining a file to be received from a neighbor node according to a user selection.

FIG. 26 is a flow diagram that depicts one example method for determining a file to be received from a neighbor node according to a user selection. According to this example method, a list of files that are available on the neighbor node is received from the neighbor node (step 560). The list of files available in the neighbor node is presented to user (step 565). A user selection is then received (step 570). The user selection, according to a variation of the present method, comprises the selection of one or more files included in the list presented to the user. The selection of one or more files is then conveyed to the neighbor node (step 575). It should be appreciated that the neighbor node within convey a portion of the selected file back to the local node.

Figure 27:
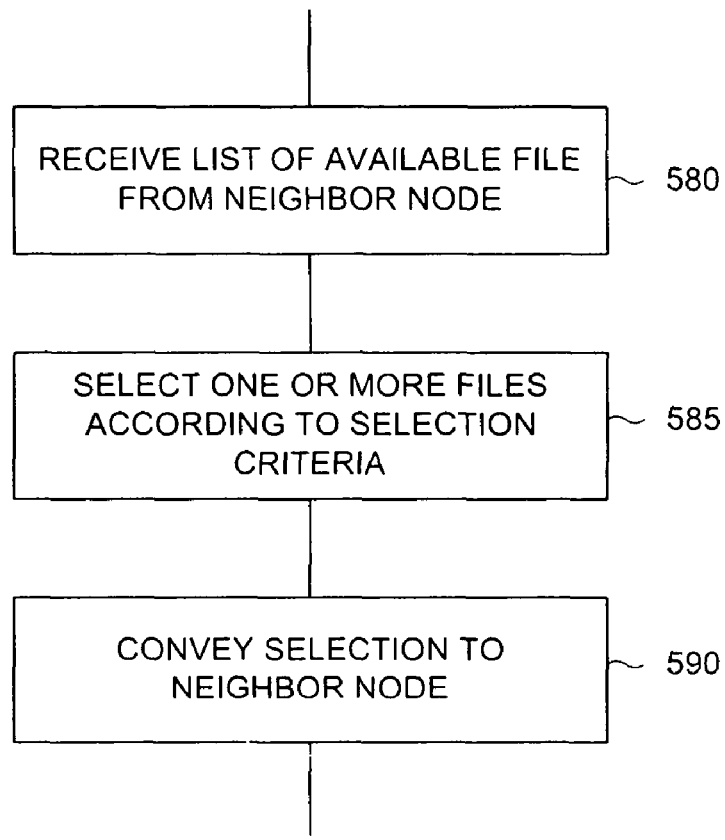
FIG. 27 as a flow diagram that depicts an example method for determining a file to the received from a neighbor node according to a selection criterion.

FIG. 27 as a flow diagram that depicts an example method for determining a file to the received from a neighbor node according to a selection criterion. According to this example method, a list of files that are available on the neighbor node is received from the neighbor node (step 580). One or more files are selected from the list of files received from the neighbor node according to a preference criterion (step 585). A preference criterion includes at least one of genera, an artist and an era pertaining to a particular media file stored on the neighbor node. Once one or more files are selected according to the preference criterion, the selection is conveyed to the neighbor node (step 590). It should be appreciated that classification used as a basis for a preference criterion are typically reflected in a filename of a file stored on the neighbor node. As such, a list of filenames received from the neighbor node will be indicative of one or more classifications. Accordingly, the classification can be used as a basis for selecting one or more files according to a preference criterion. It should further be appreciated that the local node will typically have stored therein a preference criterion useful for such selection of files and that the preference criterion, according to one alternative example method, is received from a user through at least one of a local user interface and from a configuration device. The configuration device, according to one alternative method, provides for communicating the preference criterion to a local node by means of an ad hoc connection, through a cellular data network or through a point-to-point interface. Examples of a point-to-point interface include, but are not limited to a serial interface, a parallel interface and a universal serial bus (USB) interface. It should further be appreciated that the configuration device described herein provides a user friendly interface for managing user preference criteria and content stored on a wireless device.

Figure 28:
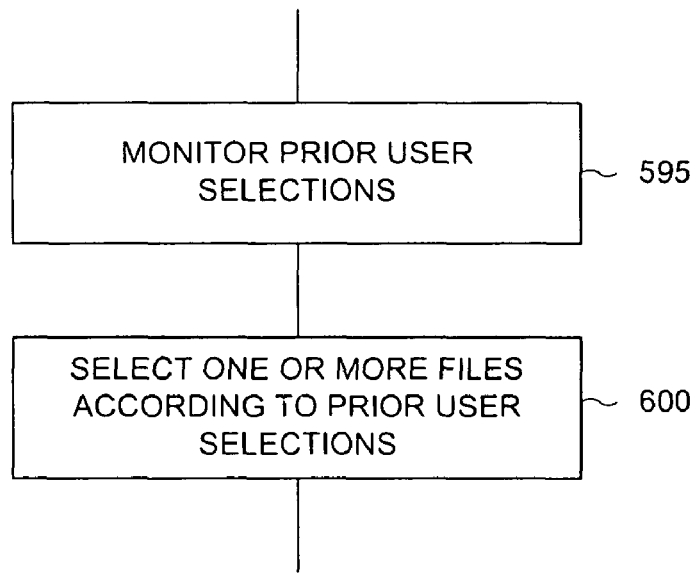
FIG. 28 is a flow diagram that depicts one alternative method for selecting a file according to a preference criterion.

FIG. 28 is a flow diagram that depicts one alternative method for selecting a file according to a preference criterion. According to this example method, selecting a file represented in a list of available files received from a neighbor node is accomplished by monitoring a prior selection of a local user (step 595). For example, according to one variation of the present method, a file to be received from a neighbor node is determined by presenting a list of available files to user. The user is then allowed to select one or more files from the presented list. It is this selection that is monitored and used as a basis for a establishing a preference criterion. Accordingly, one or more files are selected from a list of available files received from the neighbor node using this prior user selection (step 600).

Figure 29:
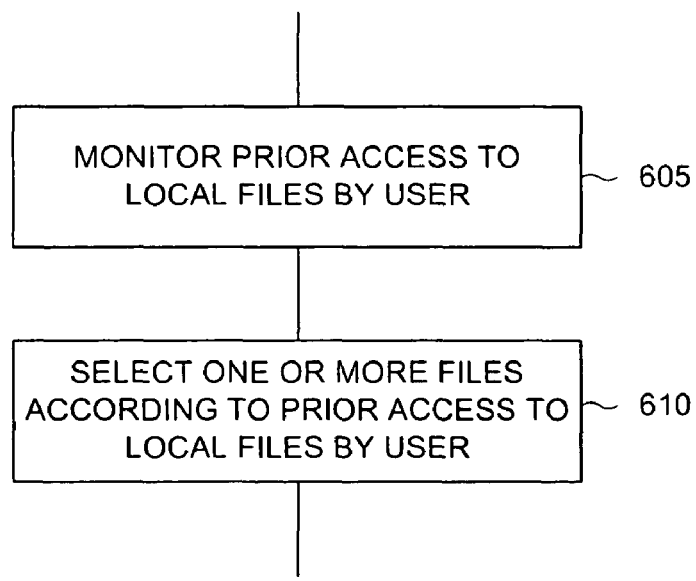
FIG. 29 is a flow diagram that depicts yet another alternative method for selecting a file according to prior use of a file by a user.

FIG. 29 is a flow diagram that depicts yet another alternative method for selecting a file according to prior use of a file by a user. According to this example method, one or more files are stored in a local node. When a user selects one of the files stored in the local node, this user selection is monitored (step 605) and used as a basis for establishing a preference criterion. Accordingly, one or more files are selected from a list of available files received from the neighbor node using this prior user selection (step 610).

Figure 30:
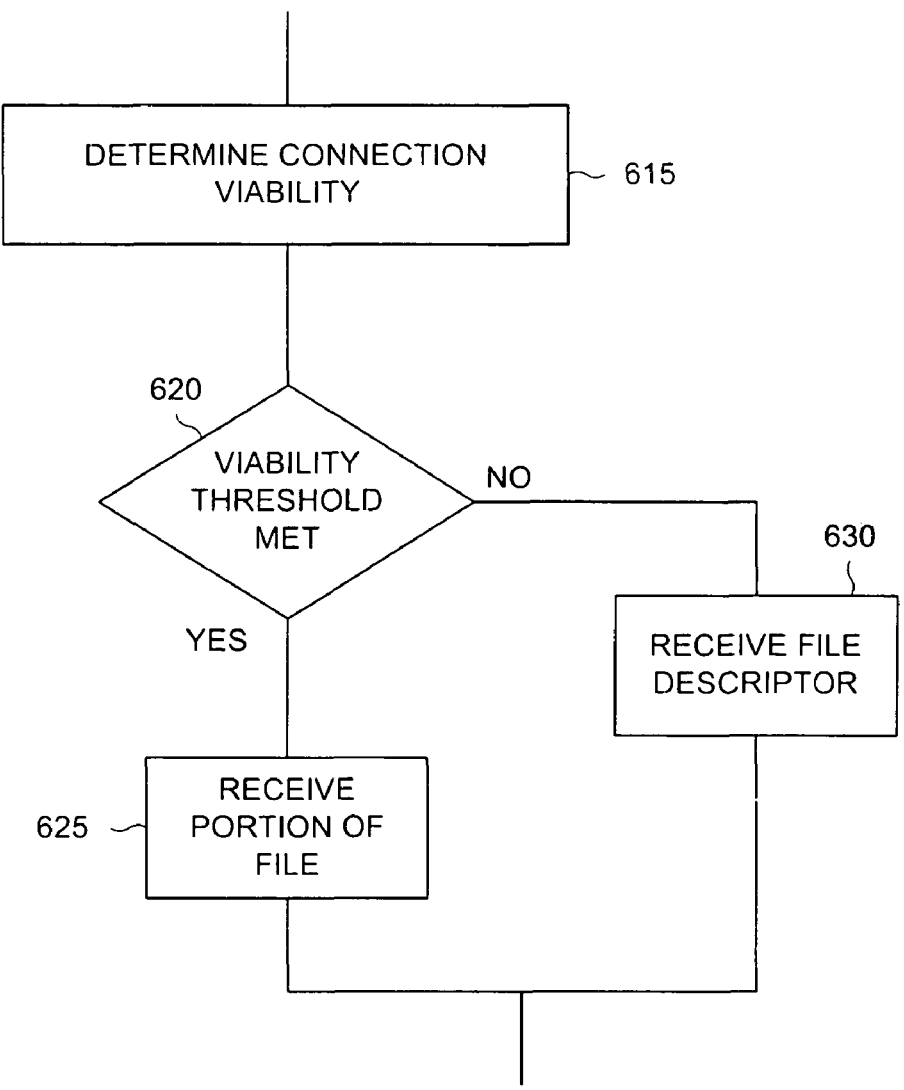
FIG. 30 is a flow diagram that depicts one alternative method for receiving a portion of a determined file from a neighbor node according to the viability of an application-level connection.

FIG. 30 is a flow diagram that depicts one alternative method for receiving a portion of a determined file from a neighbor node according to the viability of an application-level connection. According to this variation of the present method, if the viability of connection established with the neighbor node is determined (step 615). The viability of connection must meet a viability threshold (step 620). When the threshold is met, a portion of the determined file is received (step 625). When the threshold is not met, only a file descriptor is received from the neighbor node (step 630). It should be appreciated that the viability of connection between a local node and a neighbor node depends on several factors including signal strength of a wireless connection between the local node and the neighbor node. The signal strength, according to one variation of the present method, is expressed in terms of a bit error rate. Accordingly, if the bit error rate associated with a connection established between the local node and the neighbor node is too great, there is little probability that a complete or substantial portion of the file can be received by means of the established connection. The situation, however, the user of the local node may actually want a particular file even though the file cannot be effectively received. In this case, a file descriptor is received. According to one variation of the present method, the file descriptor comprises an industry standard content identifier. An industry standard content identifier is a content identifier that can be used to unambiguously identify a particular file. Once the file descriptor is received, the file descriptor can be used to receive the determined file from another source, for example an independent neighbor node or a content provider.

Figure 31:
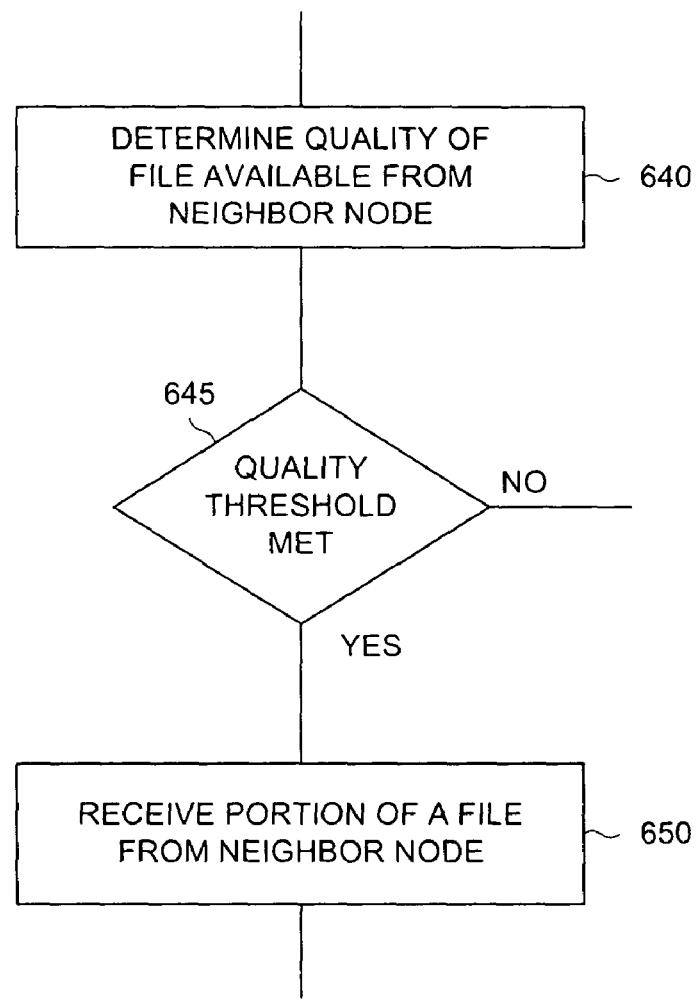
FIG. 31 is a flow diagram that depicts one alternative method for receiving a portion of a determined file according to the quality of a file available on a neighbor node.

FIG. 31 is a flow diagram that depicts one alternative method for receiving a portion of a determined file according to the quality of a file available on a neighbor node. It should be appreciated that a local node may recognize a neighbor node and that the neighbor node may in fact have stored therein one or more files that have been determined as files that are to be shared with the local node. The files stored on the neighbor node may be of a poor quality. For example, many files stored on a wireless device comprise pirated content (e.g. music or video). Yet other files stored on a wireless device comprise legitimate versions of content. Accordingly, the quality of a file to be received from a neighbor node is determined (step 640). When the quality of the file stored on the neighbor node meets a quality threshold (step 645), a portion of the file is received from the neighbor node (step 650). The quality of a file stored on a neighbor node can be expressed, according to one variation of the present method, by a bit rates at which content stored in the file is encoded. According to this variation of the present method, a file will only be retrieved from the neighbor node when the encoding bit rate is greater than a pre-established minimum. The quality of the file stored on the neighbor node can also be expressed, according to yet another variation of the present method, by the availability of the digital rights certificate associated with the file. For example, a file stored on the neighbor node that has associated there with the digital rights certificate probably comprises a legitimate version of content. Conversely, if the file stored on the neighbor node does not have associated there with the digital rights certificate, the file stored on the neighbor node probably comprises an illegitimate version content. As such, the quality threshold in this variation of the present method comprises the existence or non-existence of a digital rights certificate for a determined file.

Figure 32:
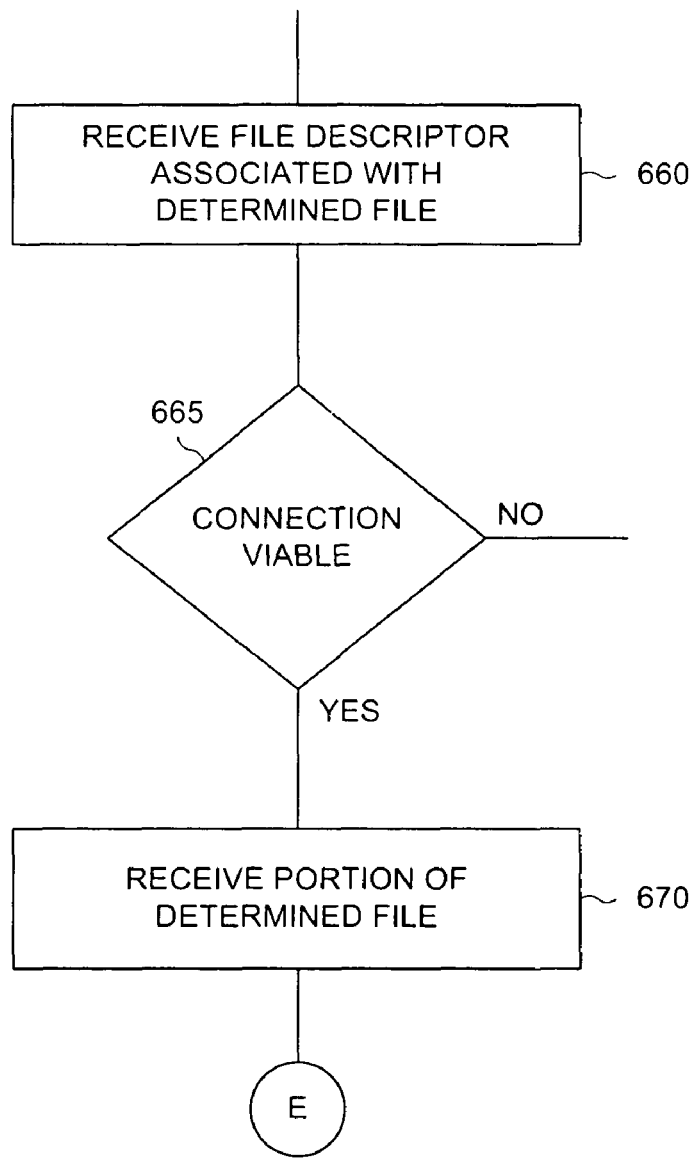
FIG. 32 is a flow diagram that depicts yet another example method for receiving a portion of file.

FIG. 32 is a flow diagram that depicts yet another example method for receiving a portion of file. It should be appreciated that a connection with a neighbor node may be temporal in nature. As such, it may be difficult to receive an entire file by a connection with a neighbor node remains viable. Accordingly, one variation of the present method provides for receiving a file descriptor associated with a determined file (step 660). While the connection remains viable (step 665), a portion of the determined file is received (step 670).

Figure 33:
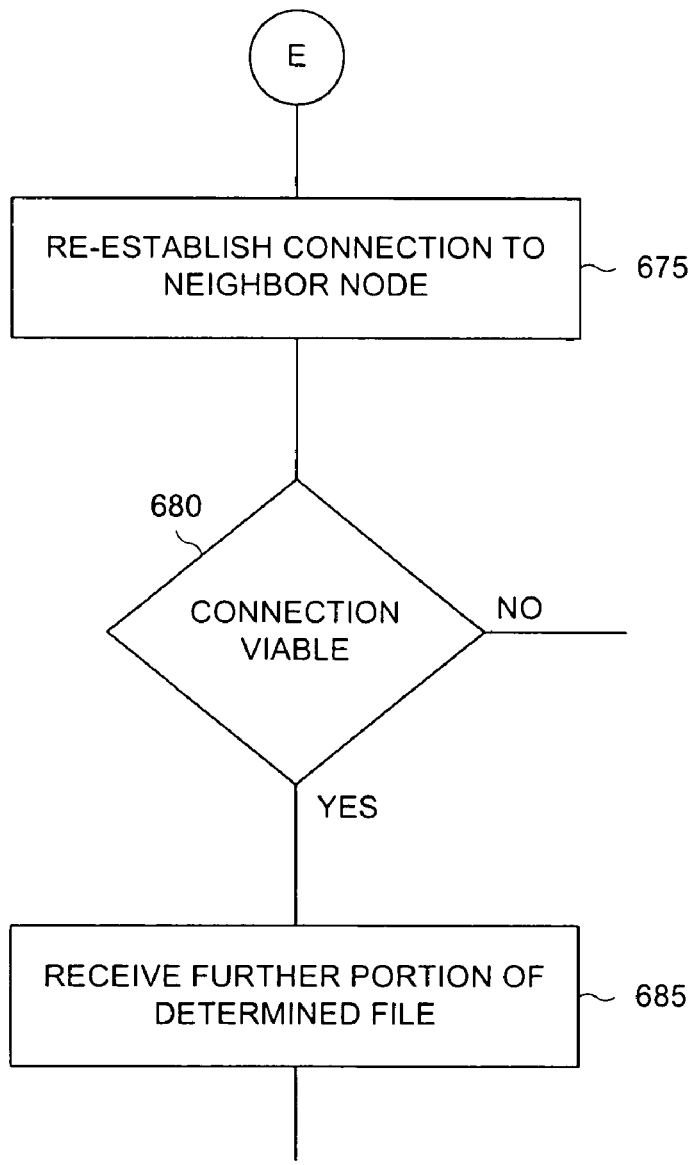
FIG. 33 is a flow diagram that depicts an example method for receiving a further portion of the file once a connection is re-established to a neighbor node.

FIG. 33 is a flow diagram that depicts an example method for receiving a further portion of the file once a connection is re-established to a neighbor node. It should be appreciated that a connection with a neighbor node, although temporal, may be re-established to sporadic manner. For example, a local node and a neighbor node may recognize each other for a particular interval in time. At some point in time, the connection may become unreliable because the local node and the neighbor node can no longer communicate with each other in a wireless manner. This can occur, for example, when the distance between the local node and the neighbor node is increased such that a connection between the two can no longer be maintained at a low enough bit error rate. However, the distance between the local note in the neighbor node can then subsequently decrease. In the situation, the connection can be re-established (step 675). So long as the re-established connection remains viable (step 680), a further portion of the determined file may be received by the local node (step 685).

Figure 34:
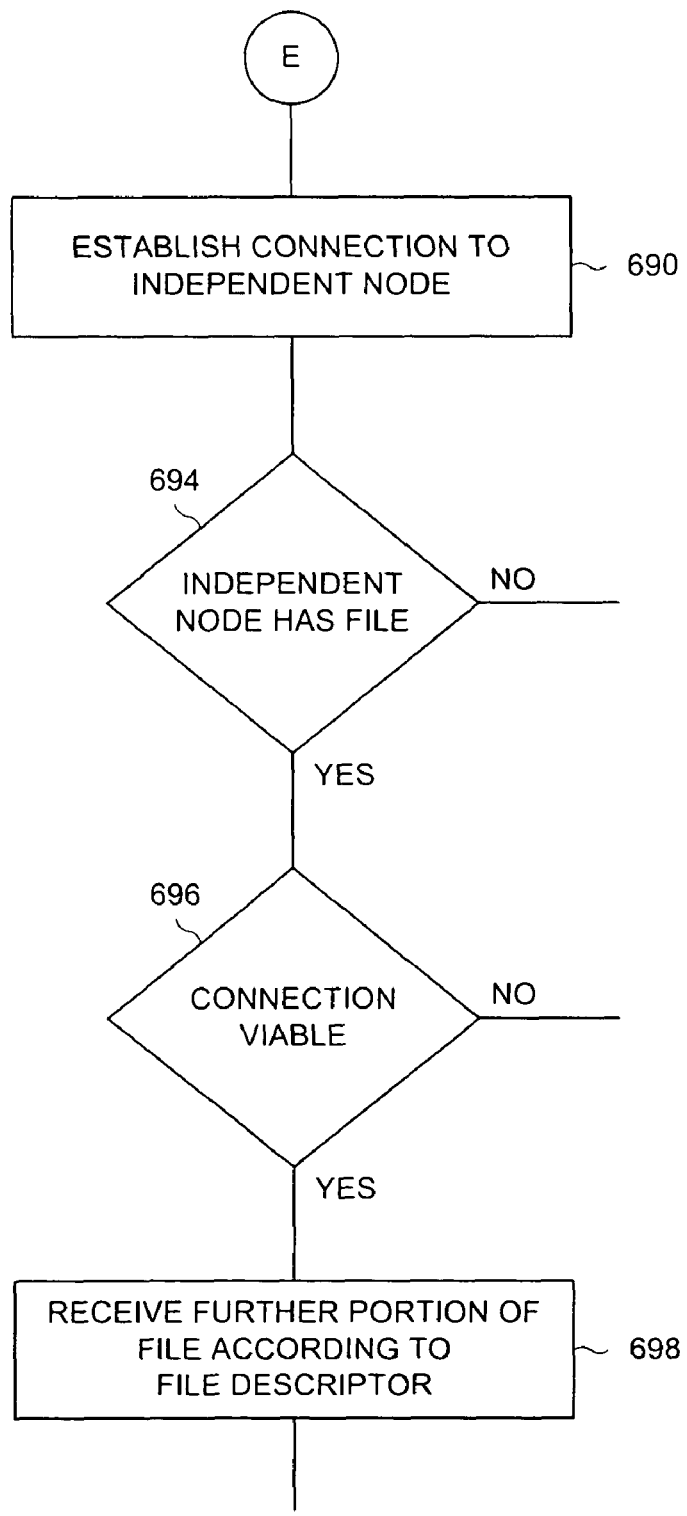
FIG. 34 is a flow diagram that depicts alternative example method for receiving a further portion of a determined file from an independent node.

FIG. 34 is a flow diagram that depicts alternative example method for receiving a further portion of a determined file from an independent node. Again, due to the temporal nature of ad hoc networking, a local node may lose contact with a neighbor node before an entire file can be received from that neighbor node. In other words, the connection between the local node and the neighbor node becomes unviable. Once the local node is able to receive a file descriptor, the local node can then search for an independent node that may have stored within it a different copy of the file which could not be entirely received from a neighbor node. It should be appreciated that the file descriptor, according to one variation of the present method, provides and unambiguously means for identifying a file. Accordingly, any file stored on any particular node that has the same file descriptor can he was the source file in order to complete the transfer of the file to the local node. Accordingly, once an application-level connection is established with an independent node (step 690), the present method provides for determining if the independent node has stored within is a file corresponding to the file descriptor (step 694). If the independent node does have a copy of the file stored within it, a further portion of the determined file is received (step 698) according to the file descriptor long as the connection with the independent node remains viable (step 696). According to one variation of the present method, the file descriptor comprises an industry standard content identifier.

Figure 35:
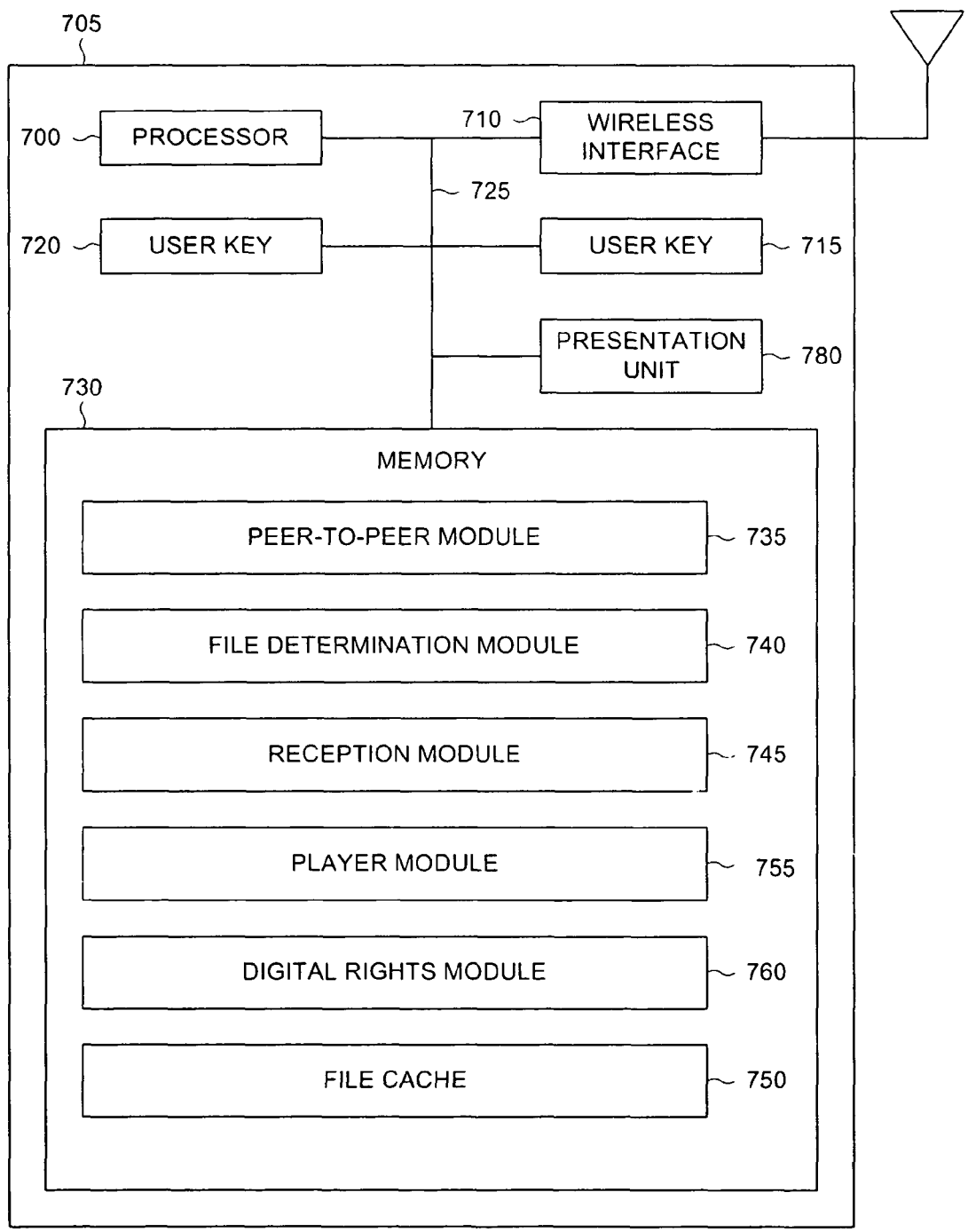
FIG. 35 is a block diagram of one example embodiment of a wireless file consumer device.

FIG. 35 is a block diagram of one example embodiment of a wireless file consumer device. According to this example embodiment, a wireless file consumer device 705 comprises a processor 700, a wireless interface 710 and a memory 730. According to one alternative embodiment, a wireless file consumer device 705 further comprises a local user interface. A local user interface, according to yet another example embodiment, comprises a user key 720 and a display 715. According to yet another example embodiment, a wireless file consumer device 705 further comprises a presentation unit 780.

This example embodiment of a wireless file consumer device 705 heretofore described further includes various functional modules each of which comprises an instruction sequence that can be executed by the processor. The instruction sequence that implements a functional module, according to one alternative embodiment, is stored in the memory 730. The reader is advised that the term "minimally causes the processor" and variants thereof is intended to serve as an open-ended enumeration of functions performed by the processor as it executes a particular functional module (i.e. instruction sequence). As such, an embodiment where a particular functional module causes a processor to perform functions in addition to those defined in the appended claims is to be included in the scope of the claims appended hereto.

The functional modules (and their corresponding instruction sequences) described thus far that enable wirelessly receiving a file are, according to one alternative embodiment, imparted onto computer readable medium. Examples of such medium include, but are not limited to, random access memory, read-only memory (ROM), Compact Disk (CD) ROM, Digital Versatile Disk (DVD), floppy disks, hard disk drives and magnetic tape. This computer readable medium, which alone or in combination can constitute a stand-alone product, can be used to convert a general-purpose computing device into a device for wirelessly providing files wherein said device is capable of receiving a file wirelessly according to the techniques and teachings presented herein. Accordingly, the claims appended hereto are to include such computer readable medium imparted with such instruction sequences that enable execution of the present method and all of the teachings herein described.

Stored in the memory 730 of this example embodiment are several functional modules including a peer-to-peer module 735, a file determination module 740 and a reception module 745. A digital rights module 760 is also included in one alternative example embodiment and is also stored in the memory 730. It should be appreciated that according to one alternative example embodiment, the wireless file consumer device further comprises a player module 755 that is also stored in the memory 730. A portion of the memory 730 is used to store files. This portion of the memory is referred to as a file cache 750.

Figure 36:
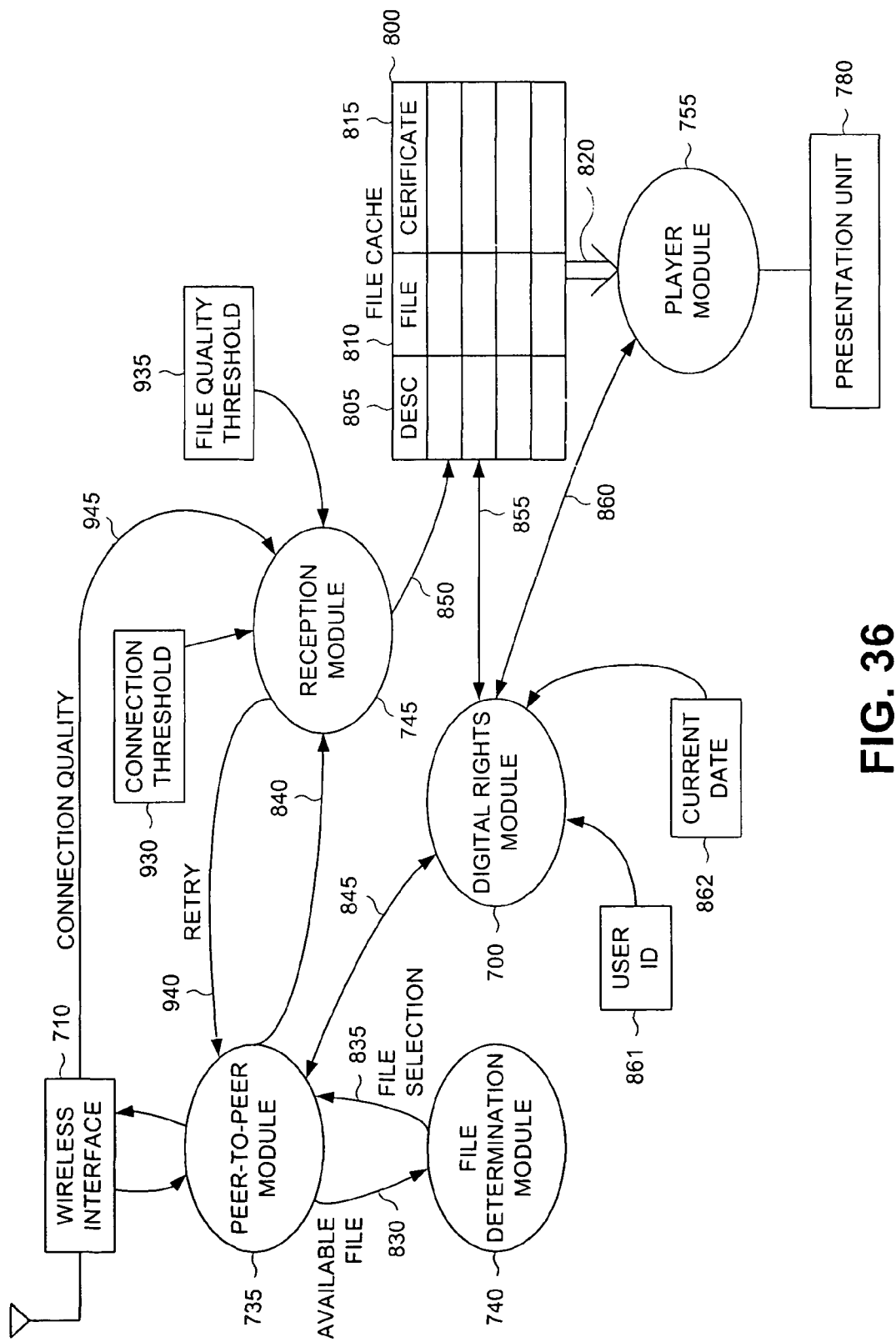
FIG. 36 is a data flow diagram that depicts the internal operation of one example embodiment of wireless file consumer device.

FIG. 36 is a data flow diagram that depicts the internal operation of one example embodiment of wireless file consumer device. According to this example embodiment, the processor 700 executes the peer-to-peer module 735. The peer-to-peer module 735, when executed by the processor 700, minimally causes the processor to recognize a neighbor node by way of the wireless interface 710. Once a neighbor node is recognized, the part of the module 735 further minimally causes the processor 700 to establish an application-level connection with recognize neighbor node using wireless interface 710.

Once a connection is established with a recognize neighbor node, the processor 700 executes the file determination module 740. When executed by the processor 700, the file determination module 740 minimally causes the processor 700 to determine a file to be received from the recognize neighbor node. The reception module 745, when executed by the processor 700, minimally causes the processor to receive into the file cache 800 a determined file while the connection to the neighbor node remains viable. The connection established with the neighbor node comprises an application-level connection established by means of the wireless interface 710. The file is stored in the field called "file" 810 included in the file cache 800.

According to one example embodiment, the wireless file consumer device 705 further comprises a presentation unit 780. This example embodiment further includes a digital rights module 760 and a player module 755, both of which are stored in the memory 730. The presentation unit 780 receives content from a file stored in the file cache 750 and presents the content to a user. The player module 755, when executed by the processor 700, minimally causes the processor 700 to retrieve 820 a file from the file cache 750 and direct the content of the file to the presentation unit 780. The digital rights module 760 of this alternative example embodiment, when executed by the processor 700, minimally causes the processor 700 to receive by way of a connection established to a neighbor node a digital rights certificate for a determined file. According to one alternative embodiment, the digital rights module 760 further minimally causes the processor 700 to store 855 the digital rights certificate in a field called "certificate" 815 included in one example embodiment of a file cache 800. It should be noted that the presentation module 755, when executed by the processor 700, further minimally causes the processor 700 to check the validity of the digital rights certificate stored in the certificate field 815 included in the file cache 800. Accordingly, the player module 755, when executed by the processor 700, will only allow the processor 700 to direct content to the presentation unit 780 when the digital rights certificate associated with a file is valid.

According to one alternative embodiment, the digital rights certificate received by the processor 700 as it executes as if the rights module 760 comprises a temporary digital rights certificate. According to yet another alternative embodiment, the digital rights module 760, when executed by the processor 700, further minimally causes the processor 700 to market as invalid a digital rights certificate stored in the file cache 800 when a current date 862 is greater than a date included in the digital rights certificate stored in a file cache 800. According to yet another alternative embodiment, the digital rights module 760, when executed by the processor 700, further minimally causes the processor 700 and to mark as invalid a digital rights certificate stored in the file cache 800 after the digital rights certificate has been used more than a pre-established number of times. Typically, the digital rights certificate includes a use-count at the processor 700 decrements each time the player module 755 requests permission from the digital rights module 760 to access a file stored in the file cache 800.

According to yet another alternative embodiment, the digital rights module 760, when executed by the processor 700, further minimally causes the processor 700 to establish a connection with the purchase manager using the wireless interface 710. According to one alternative embodiment, the digital rights module 760 causes the processor 700 to establish connection with a purchase manager using a short-range wireless interface (e.g. BlueTooth or 802.11). To yet another alternative embodiment, the digital rights module 760 causes the processor 700 to establish connection with a purchase manager using a wireless cellular data interface (e.g. the G3 network). In either case, once a connection is established to a purchase manager, the processor 700, this continues executed digital rights module 760, this further minimally causes to obtain from the purchase manager using the establish connection at least one out of the new digital rights certificate for the determined file (i.e. the file received from a neighbor node) and degree-authentication of the digital rights certificate that was received from the neighbor node by way of the connection established by the processor 700 as it executes the peer-to-peer module 735. If should be appreciated that a new digital rights certificate is used to replace a temporary digital rights certificate received from the neighbor node. A temporary digital rights certificate, according to one alternative embodiment, is re-authenticated by the purchase manager. Examples of how a new digital rights certificate is obtained or how to temporary digital rights certificate is re-authenticated have already been described, supra. According to yet another alternative embodiment, the digital rights module 760, when executed by the processor 700, minimally causes the processor 700 to receive a user identifier 861 and convey 845 a user identifier to a purchase manager using a connection established to the purchase manager by the processor 700 as it executes the peer-to-peer module 735. This alternative embodiment of the digital rights module 760, when executed by the processor 700, further minimally causes the processor 700 to mark as invalid that the digital rights certificate stored in the file cache 800 when a user-specific denial is received from the purchase manager by way of a connection established by the processor 700 as it executes the peer-to-peer module 735. Again, the connection to the purchase manager is supported by the wireless interface 710. It should again be appreciated that the wireless interface 710 comprises at least one out of a short-range wireless interface and a cellular data interface as heretofore described.

Figure 37:
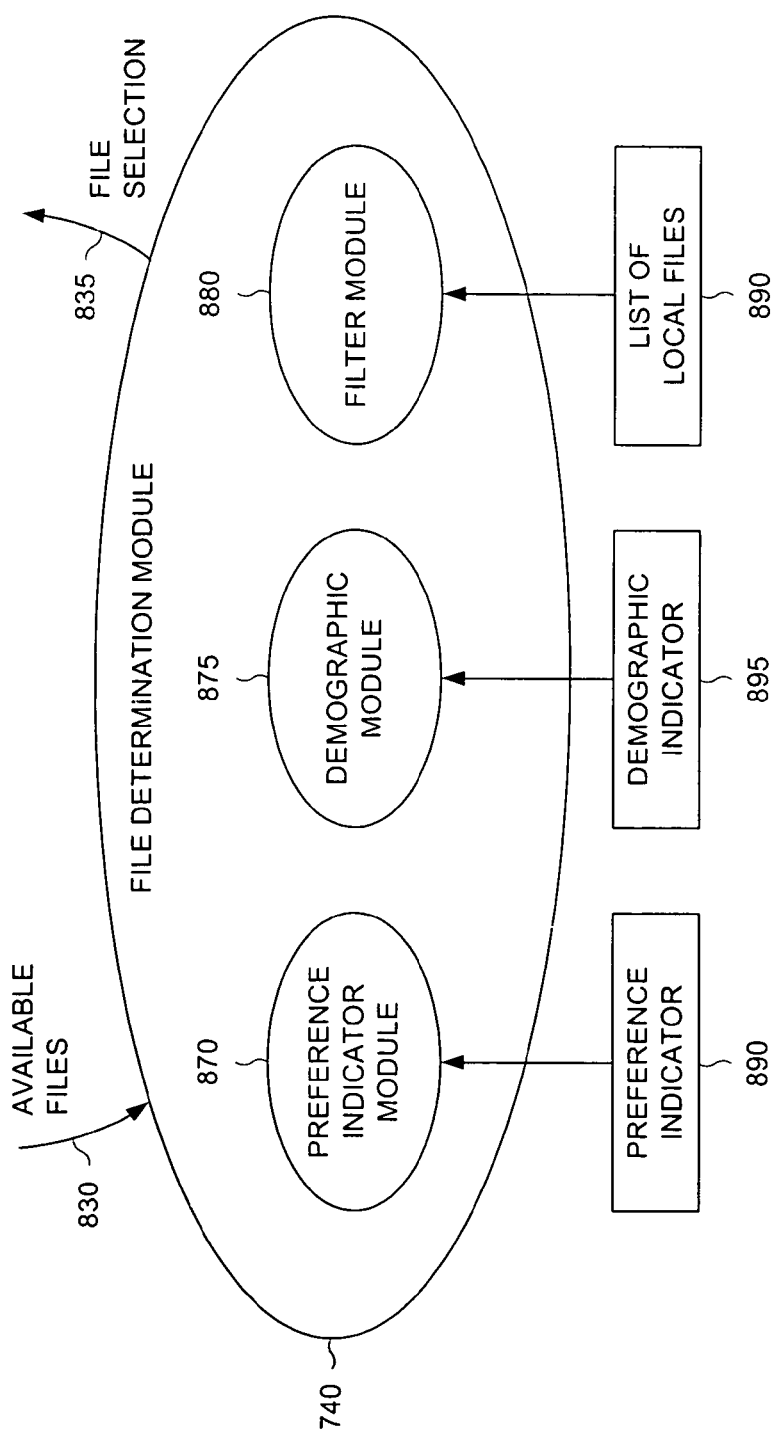
FIG. 37 as a data flow diagram depicts the internal operation of several alternative embodiments of a file determination module.

FIG. 37 as a data flow diagram depicts the internal operation of several alternative embodiments of a file determination module. According to one alternative embodiment, the file determination module 740 includes a preference indicator module 870. This alternative embodiment, the processor 700 determines a file to be received from a neighbor node by executing the preference indicator module 870. When executed by the processor 700, the preference indicator module 870 minimally causes the processor to receive a preference indicator 890. The preference indicator 890 is stored in the memory 730 and comprises an indication of user preferences of files to be received from a neighbor node. Examples such preferences include, but are not limited to content genre, content era and artist. It should be appreciated that these examples of preference indicators are intended to illustrate the present embodiment and are not intended to limit the scope of claims appended hereto. Accordingly, the preference indicator module 870, when executed by the processor 700, minimally causes the processor to direct the preference indicator to a recognized neighbor node using a connection established to the recognized neighbor node. It should be appreciated that the connection established to the recognized neighbor node comprises an application-level connection. The file determination module 740 further minimally causes the processor 700 to receive by way of the connection established a recognized neighbor node and enumeration of available files. This enumeration of available files is indicative of files that are stored in the neighbor node and are available to be received in the local node. The processor 700, as it continues to execute the file determination module 740, selects one or more files from the list of available files received from the recognized neighbor node. The processor 700, as it continues to execute the file determination module 740, conveys a file selection 835 to the neighbor node.

According to yet another alternative embodiment, the file determination module 740 includes a demographic module 875. When executed by the processor 700, the demographic module 875 minimally causes the processor 700 to retrieve the demographic indicator 895 and to convey to a connection established with a recognized neighbor node said demographic indicator. The demographic indicator 895, according to one alternative embodiment, is stored in the memory 730. The file determination module 740, when executed by the processor 700, further minimally causes the processor to receive 830 by way of a connection established with a neighbor node a list of available files. This list of available files typically represents a collection of files that are stored in the neighbor node and are available to be received by the local node. The file determination module 740, when executed by the processor 700, further minimally causes the processor 700 to select one or more files from the list of available files received from the neighbor node. The processor 700, as it continues to execute the file determination module 740, conveys the file selection 835 to the neighbor node.

According to yet another alternative embodiment, the file determination module 740 includes a filter module 880. When executed by the processor 700, the filter module 880 minimally causes the processor to receive 130 a list of available files from a neighbor node using a connection established to the neighbor node by the processor 700 as it executes the peer-to-peer module 735. The filter module 880, when executed by the processor 700, further minimally causes the processor to filter the received list of files according to files that are stored in the file cache 800. According to this alternative embodiment, a list of locally available files 190 is used to eliminate one or more files from the list of available files received from the neighbor node. The processor 700, as it continues to execute the file determination module 740, conveys the file selection 835 to the neighbor node.

According to one alternative embodiment, the filter module 880, when executed by the processor 700, causes the processor to filter the list of available files received from a neighbor node by correlating the file descriptor included in the enumeration of available files received from the neighbor node with an industry standard content identifier. As already described herein, the industry standard content identifier comprises an identifier that can be used to unambiguously identify a particular file. The processor 700, as it continues to execute the filter module 880, is further minimally caused to correlate a file descriptor included in the list of local files 890 with an industry standard content identifier. The processor 700, as it continues as the filter module 880, is further minimally caused to eliminate a file descriptor (i.e. if file) to a list of available files received from the neighbor node when the correlated industry standard content identifier for the file matches a correlated industry standard content identifier plus files included in the list of locally available files 890.

Figure 38:
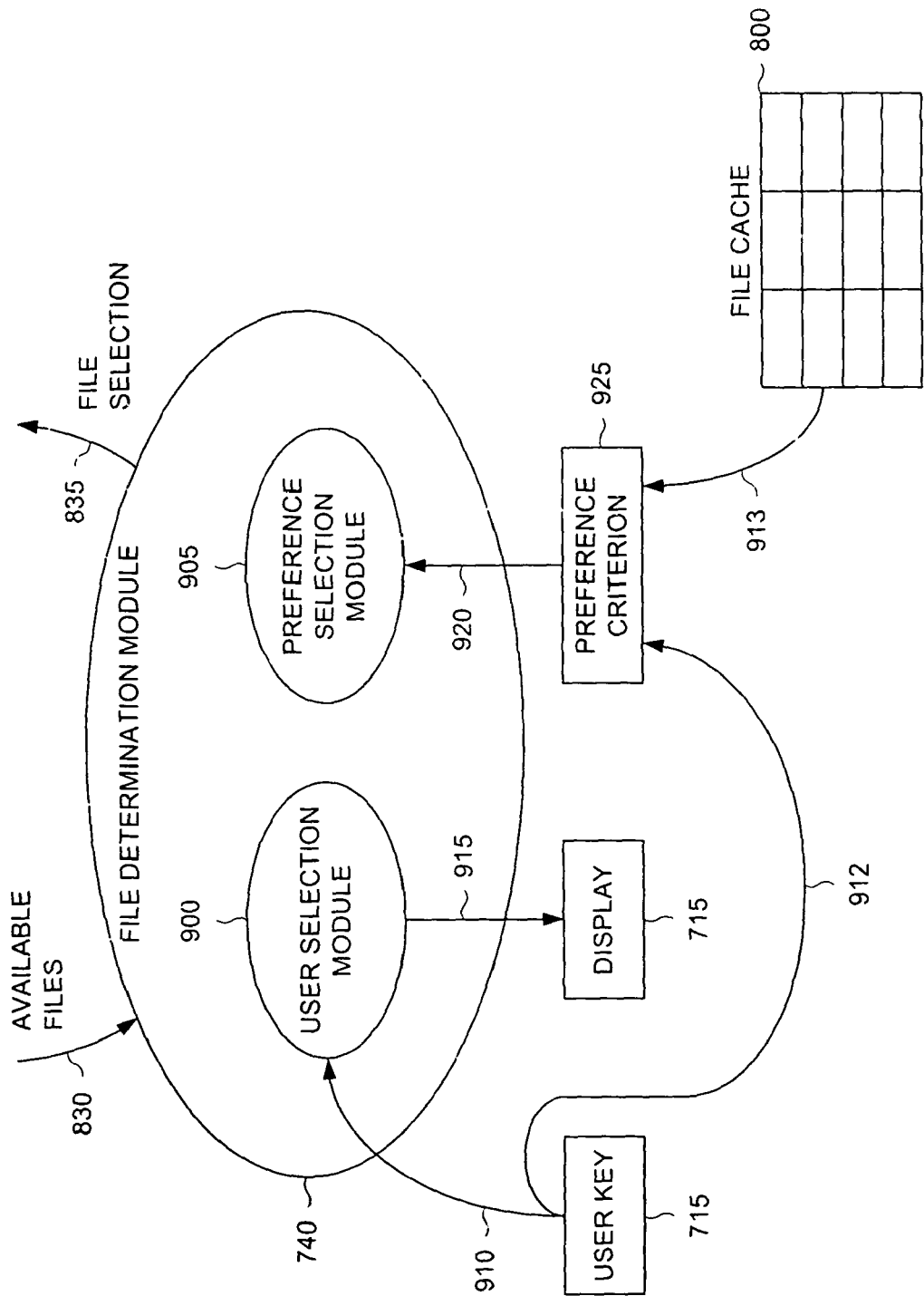
FIG. 38 is a data flow diagram that depicts the internal operation of several other embodiments of a file determination module.

FIG. 38 is a data flow diagram that depicts the internal operation of several other embodiments of a file determination module. According to one alternative embodiment, the file determination module 740 includes a user selection module 900. When executed by the processor 700, the user selection module 900 minimally causes the processor 700 to receive 830 an enumeration of available files from the neighbor node. The enumeration of available files is received by means of a connection established by the processor 700 as it executes the peer-to-peer module 735. The user selection module 900, when executed by the processor 700, further minimally causes the processor to direct 915 the list of available files to the display 715 included in this example of embodiment of a wireless file consumer device 705. A user is able to select one of files using a user key 720. The selection module 900, when executed by the processor 700, further minimally causes the processor 700 to receive 910 the user selection. The user selection is conveyed 835 to the neighbor node as the processor 700 continues to execute the file determination module 740.

According to yet another alternative embodiment, the file determination module 740 includes a preference selection module 905. The preference selection module 905, when executed by the processor 700, minimally causes the processor 700 to receive 830 by way of a connection established with a recognized neighbor node an enumeration of available files. The preference selection module 905 further minimally causes the processor to select one or more files from the enumeration of available files according to preference criterion 925. Typically, the preference criterion 925 is stored in the memory 730. The preference criterion 925 comprises at least one of a content genre, a content era and a content artist. These are but examples of preference criteria and are not intended to limit the scope of the claims appended hereto. The selection of one or more files is conveyed 835 to a neighbor node as the processor 700 continues to execute the file determination module 740.

According to yet another alternative example of embodiment, the preference selection module 905 further minimally causes the processor to monitor a prior user download selection. Accordingly, a prior user selection 912 is used to modify a preference criterion 925 stored in the memory 730. Accordingly, a selection of one or more files from an enumeration of available files received from a neighbor node is made according to a prior user download selection. For example, when a user selects a particular file belonging to a particular genre, the preference criterion 925 is updated to reflect the prior genre selection. When the user selects a particular file that is associated with a particular recording artist, the preference criterion 925 is updated to reflect the prior artist selection. Again, these are merely examples of preference criteria that can be implemented by various embodiments and the scope of the claims appended hereto is not intended to be limited to any of these examples.

According to yet another alternative example of embodiment, the preference selection module 905, when executed by the processor 700, further minimally causes the processor 700 to monitor a prior usage of a file stored in the file cache 800. Accordingly, a prior file usage 913 is used to modify a preference criterion 925 stored in the memory 730. Accordingly, a selection of one or more files from an enumeration of available files received from a neighbor node is made according to a prior file usage. For example, when a user selects a file stored in the file cache 800 that belongs to a particular genre, the preference criterion 925 is updated to reflect the prior genre selection where the user selects a file stored in the file cache 800. When the user selects a file from the file cache 800 that is associated with a particular recording artist, the preference criterion 925 is updated to reflect the prior artist selection. Again, these are merely examples of preference criteria that can be implemented by various embodiments and the scope of the claims appended hereto is not intended to be limited to any of these examples.

FIG. 36 further illustrates that, according to one alternative embodiment, the reception module 745, when executed by the processor 700, causes the processor 700 to receive into the file cache 800 a file from a neighbor node by minimally caused the processor to determine the average liability of a connection established with a neighbor node by means of a wireless interface 710. According to one alternative embodiment, the reception module 745, when executed by the processor 700, retrieves 945 a connection quality indicator from the wireless interface 710. The reception module 745 further minimally causes the processor to compare the connection quality indicator to a connection threshold 930. The connection threshold is typically stored in the memory 730. When the connection quality indicator is greater than or equal to the connection threshold 930, a portion of a determined file is received 840 from a neighbor node by means of a connection established by the processor 700 as it executes the peer-to-peer module 735. The reception module 745 further minimally causes the processor 700 to store the file in the file cache 800. The file is typically stored in a field called "file" 810 included in the file cache 800. In the event that the connection quality indicator received from the wireless interface 710 does not need to the connection threshold 930, the reception module 745 further minimally causes the processor 700 to receive 840 a file descriptor from a neighbor node by means of a connection established by the processor 700 as it executes the peer-to-peer module 735. Also in this event, the reception module 745 further minimally causes the processor 700 to store the file descriptor in the file cache 800. Typically, the file descriptor is stored in a field called "descriptor" 805 included in the file cache 800.

According to yet another alternative embodiment, the reception module 745 causes the processor to receive into the file cache a file from a neighbor node by minimally causing the processor 700 and to determine the quality of a file available from the neighbor node. According to one alternative embodiment, the reception module 745 receives 840 a file quality indicator from the neighbor node by means of a connection established with neighbor node by the processor 700 as it executes the peer-to-peer module 735. The file quality indicator, according to one alternative embodiment, comprises an encoding bit rate. In many cases, the quality of a file can be determined according to the encoding bit rate of content stored in the file. A file quality threshold 935 is retrieve by the processor 700 as it continues to execute this alternative embodiment of the reception module 745. This alternative embodiment of the reception module 745 further minimally causes the processor to compare the file quality indicator received from the neighbor node to the file quality threshold 935. The reception module 745, when executed by the processor 700, further minimally causes the processor 700 to receive into the file cache 800 a portion of the determined file when the quality of the file meets the pre-established file quality threshold 935. Otherwise, the file is not transferred from the neighbor node. Another indicator of file quality that can be used by the processor 700 as it determines the quality of a file available from a neighbor node is that of the availability of a digital rights certificate. A file that has associated therewith a digital rights certificate can be presumed to be a legitimate copy of content. Ergo, the quality of the file can be presumed to be high.

According to yet another alternative illustrative embodiment, the reception module 745, when executed by the processor 700, causes the processor to receive into the file cache 800 a file from a neighbor node by minimally causing the processor to receive into the file cache 800 a file descriptor associated with the determined file. The file descriptor is received from the neighbor node by means of a connection established through the wireless interface 710 as the processor 700 executes the peer-to-peer module 735. So long as the connection with a neighbor node remains viable, the reception module 745 further minimally causes the processor to receive a portion of the determined file into the file cache 800. According to yet another alternative embodiment, the reception module 745 receives a connection quality indicator 945 from the wireless interface 710. The reception module 745, when executed by the processor 700, further minimally causes the processor to determine the viability of a connection with neighbor node according to the connection quality indicator 945 received from the wireless interface 710.

According to yet another alternative embodiment, the reception module 745, when executed by the processor 700, further minimally causes the processor 700 to execute the peer-to-peer module 735 in order to re-establish an application-level connection with a neighbor node by way of the wireless interface 710. According to one illustrative embodiment, the reception module 745 issues a retry signal 940 to the peer-to-peer module 735. In response to the retry signal 945, the peer-to-peer module 735 is executed by the processor 700 in order to re-establish an application-level connection with the neighbor node using the wireless interface 710. So long as the re-established connection remains viable, for example by monitoring a connection quality indicator 945 received from the wireless interface 710, the assumption module 745 further minimally causes the processor 700 to receive a further portion of the determined file into the file cache 800. In this manner, a further portion of the file is retrieve from a neighbor node when a prior connection is lost and subsequently re-established.

According to yet another alternative embodiment, the reception module 745, when executed by the processor 700, further minimally causes the processor to execute the peer-to-peer module in order to establish an application-level connection with an independent node by way of the wireless interface 710. It should be appreciated that the local node may have received a file descriptor for a file the reception of said file having been interrupted because a connection with a neighbor node was lost (i.e. became unviable). In such situation, the local node may not be able to re-establish a connection with a neighbor node and would otherwise be unable to complete the reception of a determined file. In this case, processor module 745 issues a retry signal 940 to the peer-to-peer module 735. In response, the processor 700 executes the peer-to-peer module 735 in order to establish an application-level connection with an independent node using the wireless interface 710. Once an application-level connection is established with an independent node, the reception module 745 further minimally causes the processor 700 to convey the file descriptor to the independent node. The independent node can then respond when it has stored therein a file corresponding to the file descriptor. The reception module 745 further minimally causes the processor 700 to receive into the file cache 800 a further portion of the determined file according to the file descriptor so long as the connection with the independent node remains viable. Again, viability of the connection to the independent node is assessed by the processor 700 by monitoring a connection quality indicator 945 received from the wireless interface 710.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method of providing an automatic wireless exchange of media content between mobile devices based on content preferences, the method comprising:

enabling a first wireless device to recognize a second wireless device;

establishing an application-level connection with the second wireless device;

utilizing share directive data received from a user of the second wireless device to determine a shareable list of media content files located on the second wireless device;

receiving, at the first wireless device, the shareable list of media content files from the second wireless device;

determining, at the first wireless device, content preference information;

checking each file on the shareable list of media content files for a qualification match against the content preference information to automatically determine, at the first wireless device, a desired list of media content files; and downloading, at the first wireless device, a media content file on the desired list of media content files from the second wireless device, wherein initiation of the media content file downloading is independent of any user input and occurs when:

a connection viability threshold is met, the connection viability threshold comprising a signal strength of the application-level connection between the first wireless device and the second wireless device, the signal strength represented by a bit error rate; and a file legitimacy threshold is met, the file legitimacy threshold comprising (i) evaluation of an encoding bit rate of the file and (ii) availability of a digital rights certificate associated with the file; and downloading, at the first wireless device, a file descriptor associated with a media content file on the desired list of media content files from the second wireless device, wherein initiation of the file descriptor downloading is independent of any user input and occurs when (i) the connection viability threshold is not met, or (ii) the file legitimacy threshold is not met.

2. The method of claim 1, further comprising:

receiving, from the second wireless device, the digital rights certificate for the downloaded media content file; and allowing, by the first wireless device, the downloaded media content file to be accessed while the digital rights certificate is valid.

3. The method of claim 2, further comprising marking as invalid the digital rights certificate received from the second wireless device when a current date is greater than an expiration date included in the certificate or the certificate has been used more than a pre-established number of times.

4. The method of claim 1, wherein checking each file on the shareable list comprises:

filtering the shareable list of media content files according to an enumeration of locally available files; and checking each file on the filtered shareable list for a qualification match against the content preference information to determine the desired list of media content files.

5. The method of claim 1, wherein the content preference information includes at least one of a favorite artist, genre, or vintage.

6. The method of claim 1, wherein determining content preference information comprises identifying a preferred artist, genre, vintage, or publisher based on previous content file downloads to the first wireless device.

7. The method of claim 1, wherein determining content preference information comprises identifying a preferred artist, genre, vintage, or publisher based on a usage pattern of content files on the first wireless device by a user of the first wireless device.

8. The method of claim 1, wherein checking each file on the shareable list comprises:

filtering the shareable list of media content files according to demographic information pertaining to a user in communications with the first wireless device; and checking each file on the filtered shareable list for a qualification match against the content preference information to determine the desired list of media content files.

9. The method of claim 8, wherein the demographic information includes at least one of age, gender, city, state income, or hobby.

10. The method of claim 1, wherein checking each file on the shareable list comprises:

filtering the shareable list of media content files according to group membership information pertaining to a user in communications with the first wireless device; and checking each file on the filtered shareable list for a qualification match against the content preference information to determine the desired list of media content files.

11. A device for providing an automatic wireless exchange of media content between mobile devices based on content preferences, the device comprising:

a processor configured to execute an instruction sequence;

a wireless interface configured to interact with a wireless network; and a memory storing a file cache and one or more instruction sequences including:

a peer-to-peer module that, when executed by the processor, minimally causes the processor to:

recognize a neighbor wireless device, and establish an application-level connection with the recognized neighbor wireless device using the wireless interface;

a file determination module that, when executed by the processor, minimally causes the processor to:

utilize share directive data received from a user of the recognized neighbor wireless device to determine a shareable list of media content files located on the recognized neighbor wireless device, receive the shareable list of media content files from the recognized neighbor wireless device, determine content preference information pertaining to a user in communications with the device, and check each file on the shareable list of media content files for a qualification match against the content preference information to automatically determine a desired list of media content files; and a reception module that, when executed by the processor, minimally causes the processor to download a media content file on the desired list of media content files from the recognized neighbor wireless device, wherein initiation of the media content file downloading is independent of any user input and occurs when:

a connection viability threshold is met, the connection viability threshold comprising a signal strength of the application-level connection with the recognized neighbor wireless device, the signal strength represented by a bit error rate; and a file legitimacy threshold is met, the file legitimacy threshold comprising (i) evaluation of an encoding bit rate of the file and (ii) availability of a digital rights certificate associated with the file; wherein the reception module, when executed by the processor, further minimally causes the processor to download a file descriptor associated with a media content file on the desired list of media content files from the recognized neighbor wireless device, wherein initiation of the file descriptor downloading is independent of any user input and occurs when (i) the connection viability threshold is not met, or (ii) the file legitimacy threshold is not met.

12. The device of claim 11, further comprising:

a presentation unit capable of presenting the contents of a file stored in the file cache to the user;

a digital rights module that, when executed by the processor, minimally causes the processor to receive into the file cache by way of a connection established with the recognized neighbor wireless device the digital rights certificate for the downloaded media file; and a player module that, when executed by the processor, minimally causes the processor to convey to the presentation unit a file stored in the file cache according to the corresponding digital rights certificate.

13. The device of claim 11, wherein the file determination module includes a preference selection module that, when executed by the processor, causes the processor to determine content preference information by minimally causing the processor to identify previous content file downloads to the device.

14. The device of claim 11, wherein the file determination module includes a preference selection module that, when executed by the processor, causes the processor to determine content preference information by minimally causing the processor to identify a usage pattern of content files on the device by the user.

* * * * *